(12) United States Patent
Christiansen et al.

(10) Patent No.: US 11,731,850 B2
(45) Date of Patent: Aug. 22, 2023

(54) SUBSTRATE HANDLING SYSTEM COMPRISING A SHEET PROCESSING MACHINE AND AT LEAST ONE ALIGNMENT DEVICE, AND METHOD FOR ALIGNING AND/OR LOOSENING AT LEAST ONE PARTIAL STACK OF SHEETS

(71) Applicant: KOENIG & BAUER AG, Würzburg (DE)

(72) Inventors: Hans Christiansen, Limhamn (SE); Dragan Dragoz, Forel (CH); Kurt Genefke, Vejle (DK); Kaj Verner Madsen, Abenrå (DK); Kim Nielsen, Odense (DK); Julian Schubert, Karbach (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/774,663

(22) PCT Filed: Nov. 24, 2020

(86) PCT No.: PCT/EP2020/083181
§ 371 (c)(1),
(2) Date: May 5, 2022

(87) PCT Pub. No.: WO2021/170269
PCT Pub. Date: Sep. 2, 2021

(65) Prior Publication Data
US 2022/0396448 A1    Dec. 15, 2022

(30) Foreign Application Priority Data
Feb. 27, 2020   (DE) ..................... 10 2020 105 184.0

(51) Int. Cl.
*B65H 1/26* (2006.01)
*B65H 31/36* (2006.01)
(Continued)

(52) U.S. Cl.
CPC ............. *B65H 31/36* (2013.01); *B65H 1/263* (2013.01); *B65H 1/30* (2013.01); *B65H 3/322* (2013.01);
(Continued)

(58) Field of Classification Search
CPC .................... B65H 31/36; B65H 31/38; B65H 2301/4222; B65H 2403/60
See application file for complete search history.

(56) References Cited

U.S. PATENT DOCUMENTS

| | | | | |
|---|---|---|---|---|
| 316,329 A | * | 4/1885 | Brush et al. ........... | B65H 31/38 271/222 |
| 1,743,921 A | | 1/1930 | Kerley | |

(Continued)

FOREIGN PATENT DOCUMENTS

| | | |
|---|---|---|
| CN | 1561307 A | 1/2005 |
| CN | 103130011 A | 6/2013 |

(Continued)

OTHER PUBLICATIONS

Chinese Office Action received in corresponding Chinese Application No. 202080077359.2 dated Aug. 22, 2022.
(Continued)

*Primary Examiner* — Howard J Sanders
(74) *Attorney, Agent, or Firm* — Mattingly & Malur, PC

(57) ABSTRACT

In some examples, a substrate handling system includes a sheet processing machine and at least one alignment device that includes at least four stops. At least one stop is configured as a front stop, at least one stop is configured as a rear stop, and at least two stops are configured as lateral stops.
(Continued)

The at least two lateral stops are arranged opposite one another, and the at least one front stop and the at least one rear stop are arranged opposite one another. The alignment device includes at least one support element that is configured as a propping element for propping at least one partial stack of sheets in the alignment device. Further, at least one respective support element is arranged at the at least two lateral stops and at the at least one rear stop.

8 Claims, 15 Drawing Sheets

(51) Int. Cl.
 *B65H 1/30* (2006.01)
 *B65H 3/32* (2006.01)
 *B65H 5/00* (2006.01)
 *B65H 7/02* (2006.01)
 *B65H 31/38* (2006.01)

(52) U.S. Cl.
 CPC .............. *B65H 5/006* (2013.01); *B65H 7/02* (2013.01); *B65H 31/38* (2013.01); *B65H 2301/4222* (2013.01); *B65H 2301/42242* (2013.01); *B65H 2301/42256* (2013.01); *B65H 2403/55* (2013.01); *B65H 2403/60* (2013.01); *B65H 2403/944* (2013.01); *B65H 2405/1116* (2013.01); *B65H 2405/1122* (2013.01); *B65H 2405/1134* (2013.01); *B65H 2405/11425* (2013.01); *B65H 2406/12* (2013.01); *B65H 2511/30* (2013.01); *B65H 2555/30* (2013.01)

(56) References Cited

U.S. PATENT DOCUMENTS

| | | | |
|---|---|---|---|
| 5,890,713 A | * | 4/1999 | Hofmann ............... B65H 31/38 271/223 |
| 11,235,572 B2 | * | 2/2022 | Takahashi ................ B41J 2/175 |
| 2009/0110458 A1 | * | 4/2009 | Sato ....................... B65H 31/38 399/405 |
| 2016/0145072 A1 | | 5/2016 | Allen et al. |

FOREIGN PATENT DOCUMENTS

| | | |
|---|---|---|
| DE | 2723162 A | 11/1978 |
| DE | 4216123 A1 | 11/1993 |
| DE | 19607826 A1 | 9/1996 |
| DE | 10003024 A1 | 8/2001 |
| DE | 102010027119 A1 | 1/2012 |
| DE | 102012009466 A1 | 11/2012 |
| DE | 102015210556 A1 | 12/2016 |
| EP | 0614840 A1 | 9/1994 |
| EP | 2457858 A1 | 5/2012 |
| JP | 2009091119 A | 4/2009 |
| WO | 2016174221 A1 | 11/2016 |

OTHER PUBLICATIONS

International Search Report of PCT/EP2020/083181 dated Mar. 26, 2021.

* cited by examiner

SUBSTRATE HANDLING SYSTEM COMPRISING A SHEET PROCESSING MACHINE AND AT LEAST ONE ALIGNMENT DEVICE, AND METHOD FOR ALIGNING AND/OR LOOSENING AT LEAST ONE PARTIAL STACK OF SHEETS

CROSS-REFERENCES TO RELATED APPLICATIONS

This application is the US national phase, under 35 USC § 371, of PCT/EP2020/083181, filed on Nov. 24, 2020, published as WO 2021/170269 A1 on Sep. 2, 2021, and claiming priority to DE 10 2020 105 184.0, filed Feb. 27, 2020, the disclosures of which are expressly incorporated by reference herein in their entireties.

TECHNICAL FIELD

The invention relates to a substrate handling system comprising a sheet processing machine and at least one alignment device that includes at least four stops. At least one stop is configured as a front stop, at least one stop is configured as a rear stop, and at least two stops are configured as lateral stops. The at least two lateral stops are arranged opposite one another, and the at least one front stop and the at least one rear stop are arranged opposite one another. The alignment device includes at least one support element that is configured as a propping element for propping at least one partial stack of sheets in the alignment device. Examples herein further relate to a method for aligning and/or loosening at least one partial stack of sheets in a substrate handling system that includes a sheet processing machine. The at least one partial stack is positioned in an alignment device and the at least one partial stack is aligned and/or loosened by the alignment device. The alignment device includes at least four stops. At least one stop is configured as a front stop, at least one stop is configured as a rear stop, and at least two stops are configured in each case as a lateral stop. The at least two lateral stops are arranged opposite one another. Further, the at least one front stop and the at least one rear stop are arranged opposite one another. The at least two lateral stops and the at least one rear stop are moved at least temporarily, and the at least one partial stack, while being positioned in the alignment device, is deposited onto at least one support element.

BACKGROUND

Substrates are handled and/or processed in a substrate handling system, for example. The infeed of in particular sheet-format substrate frequently takes place in the form of at least one substrate stack. To enable handling and/or processing of the substrates in keeping with the respective application, it is necessary to align and/or loosen the substrates within the substrate stack and/or at least within a partial stack.

WO 2016/174 221 A1 shows a printing press assembly that has multiple processing stations for sheets. A transfer unit is arranged upstream from a non-impact printing unit and aligns each of the sheets true to register in terms of its axial register and/or circumferential register and/or diagonal register relative to the printing position of the non-impact printing unit.

DE 10 2010 027 119 A1 shows a method and a device for positioning sheets for subsequent processing in a sheet-processing machine. The positioning is carried out without the use of front or lateral stops. The sheet is roughly positioned in the circumferential and oblique directions by stopping the sheet in a controlled manner, with a lateral alignment taking place in the area of an infeed table, and a fine positioning in the circumferential and oblique directions taking place by positioning register stops of a sheet transport system. An independent servo motor is assigned to each register stop.

U.S. Pat. No. 1,743,921 A shows a printing press. The delivery includes a combination of jogger plates that have blowing nozzles, wherein the printed substrate is dried while being deposited on a delivery stack.

A jogging table is known from DE 100 03 024 A1, which comprises a base plate including stops by which a stack of sheet-format material is aligned. At least one blowing nozzle is assigned to at least one stop.

DE 10 2012 009 466 A1 shows a conveyor device for conveying separated sheets, in particular fuel cell components, over a conveyor section to a transfer position. The transfer position has a stop. The conveyor section is at least partially configured as an air table, which has at least one outlet opening for acting upon the underside of the sheet to be conveyed by means of a gas flow. Additionally, at least one gas discharge is provided at the transfer position.

DE 196 07 826 A1 discloses a sheet feeding device for reproduction apparatuses. The individual sheets are consecutively urged into engagement with a first stop to form a stack of individual sheets. Second and third stops are used to align the stack of individual sheets, wherein the second and third stops are caused to oscillate. During the jogging action, the second and third stops are moved sufficiently in the direction toward the center line to cause the sheet stack to buckle.

EP 0 614 840 A1 discloses a jogging table for jogging material present in layers of sheets, which can be tilted out of a horizontal position. At least two adjacent sides of the support table that can be caused to vibrate include lateral stops. Blower devices for blowing in air are integrated into at least a first of the stops. A second stop and a third stop can travel perpendicularly to the plane of the support table.

DE 10 2015 210 556 A1 teaches a delivery of a sheet processing machine. Front edge stops, lateral edge stops carrying out a periodic jogging movement, and movably mounted rear edge stops are provided for aligning the sheets that are dropped and form the delivery stack.

DE 42 16 123 A1 teaches a format-changing stacking station for consecutively delivered sheet products, comprising a stacking basket having a collection base and lateral, front and rear stops. The stops can be adjusted by format adjusting means for adapting to the sheet format. The collection base is made of multiple parallel bars, which can be adjusted transversely to their longitudinal orientation by means of format adjusting means. The bars can also be displaced in the direction of their longitudinal axis. The format adjusting means for the elements that are adjustable in the x direction are coupled to one another and connected to a first drive device. The format adjusting means for the elements that are adjustable in the y direction are coupled to one another and connected to a second drive device.

The teaching of DE 27 23 162 A1 discloses a device for transferring a partial stack of material to be cut from an overall stack to a vibrating table. The device for transferring the partial stack comprises grippers, which loosen the partial stack. The vibrating table has two edges including side walls, which come together at a lowest tip of the vibrating table, in particular when the table is inclined diagonally. A clamping device is provided at one of the lowest edges, which is placed onto the partial stack and clamps the stack.

The teaching of EP 2 457 858 A1 discloses a device for forming bundles composed of printed products. A holding area has two side walls. A lift comprising at least one lift element is arranged within the holding area, onto which printed products can be deposited. The printed products can be compressed into a bundle with the aid of an upward movement of the lift element that is directed against at least one pressing element. The at least one lift element can be moved out of the holding area into a position in which the bundle is released.

US 2016/0145072 A1 teaches a device for buffering a stack of sheets. The device comprises a first and a second side guide, each having a face facing transverse to the travel direction, and a backstop, which faces an input section of sheets and is spaced from the input in the travel direction, these defining a hopper for holding the sheets. Sheets are deposited onto at least one first retractable support and onto at least one second retractable support, and are then deposited onto supports configured as accumulators and accumulated. The retractable supports as well as the accumulators are each assigned to the first and second side plates.

JP 2009-091119 A discloses a device for aligning at least one uppermost sheet of a stack after a sheet arranged thereon has been lifted off the stack. The device has a first alignment of sheets in a lateral direction between two lateral stops, and a second alignment of sheets between a front stop and a rear stop. The device is set to the present geometry and size of the sheets by means of an adjustable frame. A respective pneumatic cylinder is assigned to the lateral stops, the front stop and the rear stop, which moves the particular stop back or forth to apply pressure to the lateral edges of the sheets. The lateral stops can comprise another pneumatic cylinder, which generates an oscillation. At least the uppermost sheet, in general two to three uppermost sheets, of a stack of sheets are aligned by means of the device.

SUMMARY

It is the object of the invention to devise a substrate handling system comprising a sheet processing machine and at least one alignment device, and a method for aligning and/or loosening at least one partial stack of sheets.

The object is achieved according to the invention by the substrate handling system comprising a sheet processing machine and at least one alignment device including at least one respective support element is arranged at the at least two lateral stops and at the at least one rear stop. Additionally, the method for aligning and/or loosening at least one partial stack of sheets includes that the at least one partial stack, while being positioned in the alignment device, is deposited onto at least one support element that is in each case arranged at the at least two lateral stops, and onto at least one support element that is arranged at the at least one rear stop.

The substrate handling system comprises a sheet processing machine and at least one alignment device. The at least one alignment device includes at least four stops, wherein at least two tops are in each case arranged opposite one another. At least one stop is configured as a front stop, and at least one stop is configured as a rear stop, and at least two stops are in each case configured as lateral stops. The at least two lateral stops are arranged opposite one another. The at least one front stop and the at least one rear stop are arranged opposite one another. Advantageously, the at least one front stop is configured to be fixed in its position. At least one of the at least four stops advantageously includes at least one blower device comprising at least one fluid ejecting nozzle. In addition, or as an alternative, the alignment device comprises at least one support element. In addition, or as an alternative, at least one respective support element is arranged at the at least two lateral stops and at the at least one rear stop. In addition, or as an alternative, the at least four stops advantageously each comprise a drive generating a vibration or an oscillating movement. In addition, or as an alternative, the at least two lateral stops and/or the at least one rear stop each comprise at least two drives.

In a method for aligning and/or loosening at least one partial stack of sheets in a substrate handling system comprising a sheet processing machine, the at least one partial stack is positioned in the alignment device. The at least one partial stack is aligned and/or loosened by the alignment device. Of the at least four stops, the at least two stops configured as lateral stops and the at least one stop configured as the rear stop are moved and/or can be moved at least temporarily. Advantageously, at least one of the at least four stops comprises the at least one blower device, wherein at least one nozzle of the blower device ejects fluid, at least during the alignment of the partial stack. In addition, or as an alternative, the at least one stop configured as the front stop and at least one of the at least two lateral stops are advantageously at least temporarily fixed in their position, wherein the at least one rear stop at least temporarily and at least one further of the at least two lateral stops at least temporarily decrease or increase their respective distance with respect to the fixed front stop and/or with respect to the fixed lateral stop. In addition, or as an alternative, at least one of the at least two lateral stops and/or the at least one rear stop are advantageously each moved by at least two drives. In addition, or as an alternative, the at least one partial stack, while being positioned in the alignment device, is deposited onto at least one support element. In addition, or as an alternative, the at least one partial stack, while being positioned in the alignment device, is deposited onto at least one support element that is in each case arranged at the at least two lateral stops. In addition, or as an alternative, the at least one partial stack, while being positioned in the alignment device, is deposited onto at least one support element that is in each case arranged at the at least two lateral stops, and onto at least one support element that is arranged at the at least one rear stop. In addition, or as an alternative, the at least two lateral stops and/or the at least one rear stop are advantageously each caused to carry out a vibration and/or an oscillating movement by at least one drive generating a vibration and/or an oscillating movement.

An advantage to be achieved with the invention is, in particular, that in particular sheet-format substrate can be easily and reliably processed and/or handled. Easy and reliable handling and/or processing of the stack by the alignment device are ensured in particular in the case of stacks of substrate, in which individual sheets of the substrate tend to block one another and/or, for example due to different amounts of printing fluid or other materials, such as toner or powder, being applied to the substrate, create different topographies over the surface of the stack, and/or when dog ears occur. By using a partial stack in the alignment device, the disadvantage of differences in the topographies is advantageously eliminated.

Advantageously, the at least one blower device supports the alignment and/or loosening of the at least one partial stack in the alignment device. The sheets are advantageously loosened and/or detached from one another in particular by generating an air cushion beneath the bottommost sheet and/or as a result of fluid blown in between individual sheets of the at least one partial stack.

The at least one support element advantageously replaces in particular a base plate or a solid bottom of the alignment device. In this way, in particular a modular configuration of the substrate handling system and/or uninterrupted post-press processing of the at least one partial stack subsequent to the alignment device are possible. A further module for processing the partial stack is arranged beneath the alignment device, for example. As a result of the at least one support element, it is advantageously also possible to ensure that the stops are flexibly set to the format size of the sheets of the partial stack.

The at least two drives of the at least two lateral stops and/or of the at least one rear stop advantageously ensure that a movement of the respective stop toward an opposing stop or away therefrom is generated, regardless of a vibration or an oscillating movement of the particular stop, and/or that the at least two movements can be controlled and/or are controlled independently of one another. The vibration of the stops advantageously supports the alignment and/or loosening of the at least one partial stack.

In particular, advantageously in particular the edges of the individual substrates of a partial stack can be aligned by the alignment device and/or are aligned by the at least four stops.

Another advantage is a rapid and/or simple transition between different format sizes of substrate since the at least one alignment device, in particular the distance between the at least four stops, is and/or can be individually adapted, preferably to each fed partial stack. Advantageously, a production duration of several hours is possible, in particular when the format size of the substrate remains the same.

In particular in addition, an alternative substrate handling system and an alternative method for operating a substrate handling system are advantageously devised. In particular, a semi-automatic or fully automatic system is devised, which can be adapted or is adapted to the diverse requirements.

Further advantages are apparent from the following description.

BRIEF DESCRIPTION OF THE DRAWINGS

Exemplary embodiments of the invention are illustrated in the drawings and will be described in greater detail below. The drawings show.

DETAILED DESCRIPTION

Figure 1:
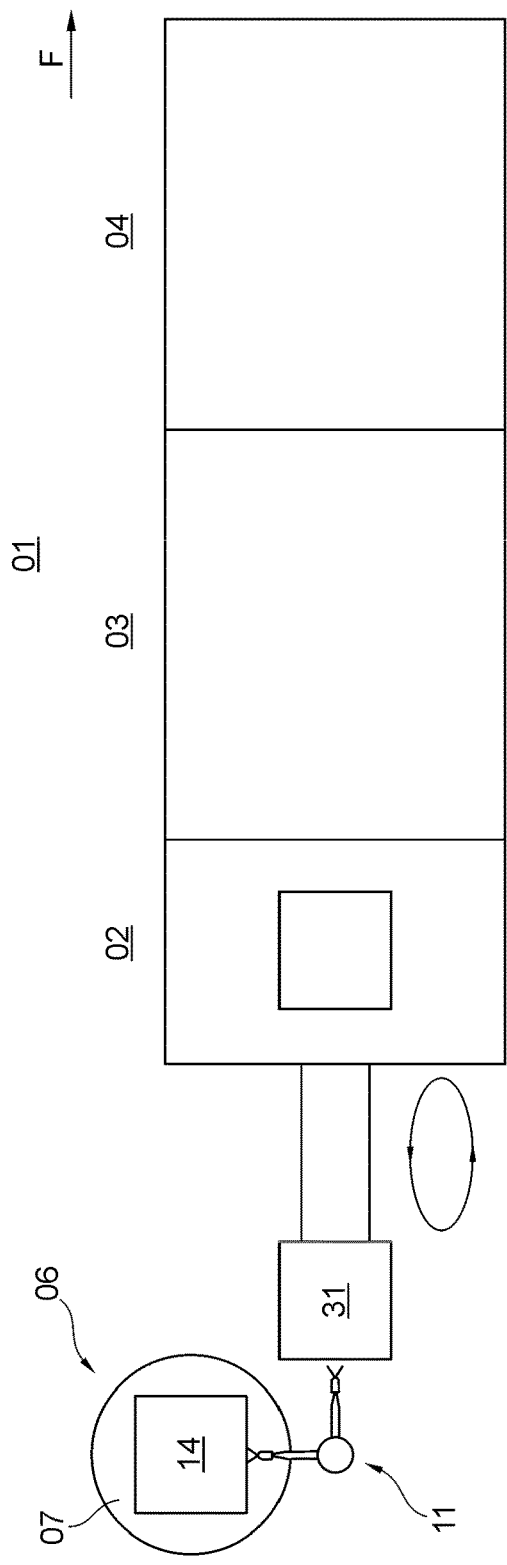
FIG. 1 a top view onto a substrate handling system comprising an infeed system, a robot cell, and a working machine.
Figure 2:
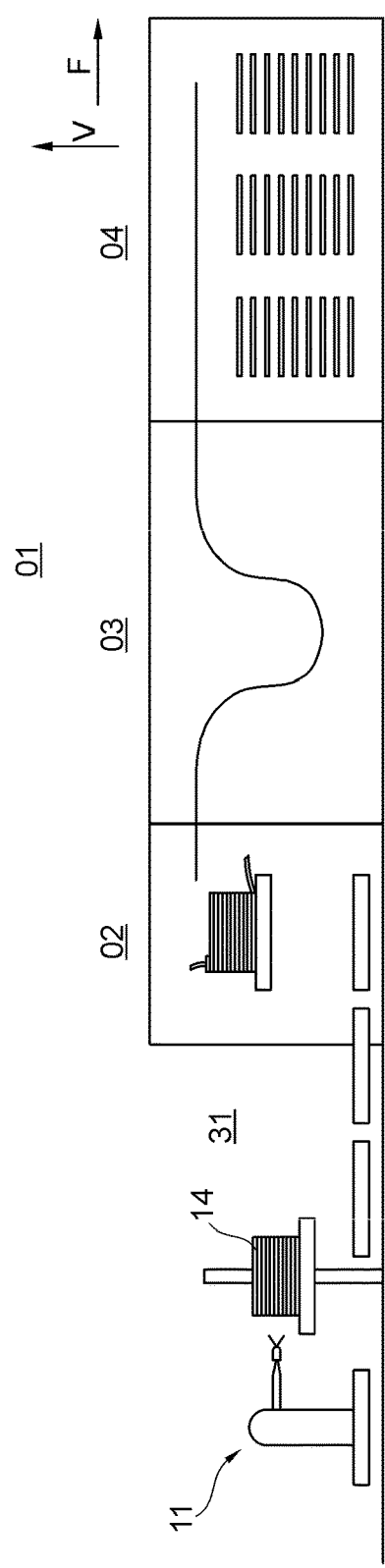
FIG. 2 a side view of the substrate handling system comprising the working machine and the robot cell according to FIG. 1.
Figure 3:
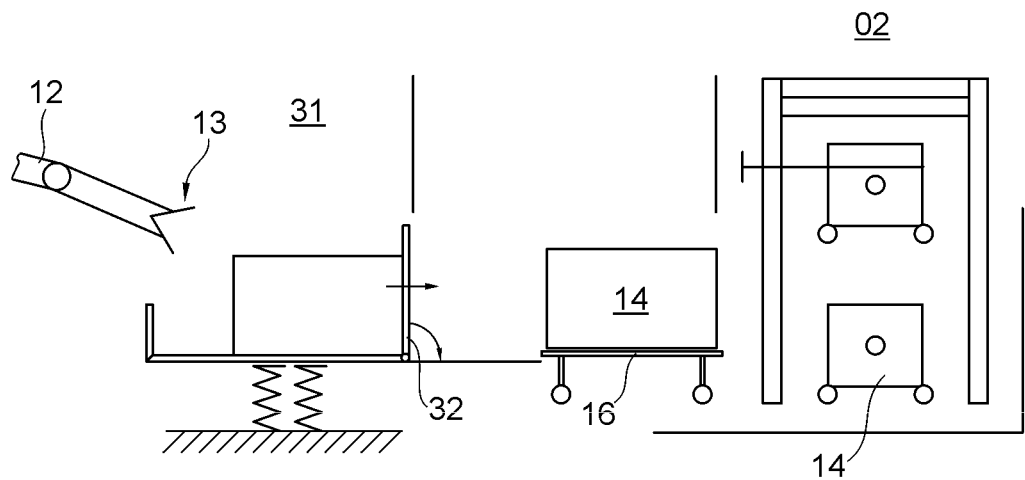
FIG. 3 a first embodiment of an exemplary alignment device comprising a downstream feeder.

A substrate handling system comprises at least one working machine 01. Preferably, at least one alignment device 31 is connected upstream from the at least one working machine 01. For example, at least one robot cell 11 is connected upstream from the at least one working machine 01.

The working machine 01 is a sheet working machine configured as a sheet processing machine 01, in particular a sheet-fed printing press. The working machine 01 is preferably configured as a sheet offset rotary printing press or as a flexo printing press or as an inkjet printing press, for example in a unit-based and inline configuration. The working machine 01 is more preferably configured as a printing press, which works, for example prints and/or coats and/or numbers and/or cuts and/or inspects, fed substrate, in particular substrate in sheet form, for example printing substrate sheets. The substrate handling system is preferably used to work and/or process value or banknote material.

Above and below, working a substrate describes changing at least one property of the relevant substrate, such as its position and/or physical properties and/or material properties. Above and below, processing a substrate describes changing at least one property of the relevant substrate with respect to its physical properties and/or material properties, in particular its mass and/or shape and/or appearance. The substrate can be converted into at least one intermediate product that can be further worked and/or into an end product by at least one processing operation. The sheet processing machine 01 is preferably configured to process substrate, in particular sheets, for example substrate sheets. The sheet to be processed and/or the sheet, in particular the substrate sheet, already processed by the sheet processing machine 01 preferably has at least two multiple-ups, preferably at least four multiple-ups, more preferably a multiplicity of multiple-ups.

Above and below, a substrate is a material that can be processed by the at least one sheet processing machine 01, preferably onto which a medium, in particular a printing fluid, such as inks and/or printing colors and/or coating materials, or further materials, such as toner or powder, can be printed. The substrate is preferably configured as paper and/or cardboard and/or foil, for example a plastic film. The substrate is preferably configured as sheets. Above and below, the term sheet refers in particular both to sheets that have not yet been processed by means of the at least one sheet processing machine 01, and to sheets that have already been processed by means of the at least one sheet processing machine 01 and in the process may have been altered in terms of their shape and/or their mass. Above and below, the term multiple-up preferably refers to the number of identical objects that are produced from the same piece of material and/or are arranged on joint substrate material, for example a joint sheet. A multiple-up is preferably the region of a sheet that is either configured as a product of the sheet processing machine 01, in particular as an intermediate product for producing an end product, and/or, for example, is further processed and/or is configured to be further processable to a desired or required end product. The desired or required end product here, which was preferably generated by further processing the respective multiple-up, is preferably a banknote and/or a security. In a preferred embodiment, a respective sheet has a format size, i.e., an extension in its width and length, of at least 200 mm×200 mm (two hundred millimeters by two hundred millimeters), preferably of at least 300 mm×300 mm (three hundred millimeters by three hundred millimeters), more preferably of at least 400 mm×400 mm (four hundred millimeters by four hundred millimeters), more preferably of at least 450 mm×450 mm (four hundred fifty millimeters by four hundred fifty millimeters). A respective sheet preferably has a format size of no more than 2,000 mm×2,000 mm (two thousand millimeters by two thousand millimeters), preferably of no more than 1,500 mm×1,500 mm (one thousand five hundred millimeters by one thousand five hundred millimeters), more preferably of no more than 1,000 mm×1,000 mm (one thousand millimeters by one thousand millimeters), more preferably of no more than 850 mm×850 mm (eight hundred fifty millimeters by eight hundred fifty millimeters). For example, the sheet in each case likewise has a right-angled format size within the described tolerances, wherein its length differs from its width. As an alternative, for example, a format of the sheets that differs from a right-angled format is present, for example having corners not equal to 90° (ninety degrees).

The working machine 01 configured in particular as a sheet processing machine 01 comprises, for example, a feeder 02 to which substrate in sheet form can be fed and/or is fed. An infeed, one or more processing mechanisms or units that process the sheets, such as printing units 03, and a delivery 04, for example, adjoin the feeder 02, preferably in the conveying direction F, in particular in the conveying direction F of substrate. Above and below, the conveying direction F of substrate is the direction in which substrate is conveyed through the substrate handling system, in particular a direction that is oriented, along the transport path, from a first object of the substrate handling system, which includes the substrate and is in particular configured as an infeed system 06, to a last object, which includes the substrate and is configured as a delivery 04.

The processing machine 01 preferably includes a conveyor system, which is not shown in greater detail and conveys the substrates to be worked, for example to be printed and/or to be coated and/or to be processed, through the processing machine 01. For example, the conveyor system can comprise conveyor belts and/or rotating sheet guide cylinders, the sheet guide cylinders fixing the substrate at the leading edge by means of grippers and transferring it by opening and/or closing the grippers. The processing machine 01, for example, additionally comprises at least one turning device for turning the substrates.

In the delivery 04, a chain conveyor system, comprising two delivery chains which are each guided laterally at the stand of the delivery 04 and between which gripper carriages are arranged, which convey the substrate to a delivery stack, can be configured as a conveyor system, for example. The gripper carriages can comprise sheet fixing systems for this purpose, by way of which the substrates to be conveyed can be gripped at the leading edge. From the delivery chains, the gripper carriages can be guided on a gripper carriage track in the conveying direction F to beyond the delivery stack, where the gripper carriages release the substrates for deposition. One or more substrate stacks 14 can be formed in the delivery 04.

In addition to the working machine 01, configured in particular as a sheet processing machine 01, for processing and working stacked substrates, the substrate handling system comprises an infeed system 06 for feeding stacked substrates, in particular substrate stacks 14, for processing and working by the processing machine 01. The infeed system 06 preferably includes at least one staging space 07 for staging at least one substrate stack 14, made of individually stacked substrates, to be worked by the working machine 01. The staging space 07 of the substrate is preferably located in the area of a robot cell 11, i.e., an operating zone of an industrial robot, in such a way that the robot is able to handle the staged substrate. The infeed system 06 preferably stages stacked substrates, which are fed in a stacked state on a support in the form of a pallet, for example. The substrate stacks 14 staged by the infeed system 06 are, for example, provided as overall stacks, or also as partial stacks separated by means of stacking or separating aids. Furthermore, the provided substrate stacks 14 are preferably provided in packaged and/or sealed form. The provided substrate stacks 14 have been printed, for example, in a preceding printing pass or, alternatively, are present as unprinted substrates of the substrate stack 14.

Adjoining the infeed system 06, for example, at least one workstation of an operator is provided, who loosens the provided substrate and/or separates individual sheets, for example within a partial stack of substrate, from one another. In a preferred embodiment, for example as an alternative to the at least one workstation of the operator, the substrate handling system, preferably between the infeed system 06 and the working machine 01, comprises the robot cell 11, which in particular comprises a robot 12 that is preferably configured as a dual-arm robot 12. The dual-arm robot 12 preferably comprises two arms that can be moved independently of one another, each including at least one gripper system 13, which in each case particularly preferably at least have at least two, preferably at least three, more preferably at least four, more preferably six, degrees of freedom. The gripper systems 13 of the dual-arm robot 12 are preferably each configured to handle a plurality of substrates. For example, each of the gripper systems 13 can comprise at least two gripper fingers, which can be configured to be movable toward one another for gripping. Furthermore, the gripper systems 13 can have pneumatic connections, in particular blower air nozzles. A separating aid for insertion into the substrate stack 14 can also be assigned to one or both gripper systems 13.

The infeed system 06 is in particular operated in such a way that selectively differently stacked substrates can be fed thereby. This means in particular that substrates stacked by the infeed system 06 are brought into the operating zone of the robot cell 11, in particular into the gripping zone of the dual-arm robot 12 or into the operating zone of the at least one workstation. In the process, the infeed system 06 can in particular feed substrate stacks 14 made of substrates that are stacked without being separated or made of substrates separated by stacking aids. The substrate stacks 14 made of substrates that have not been separated, or the substrate stacks 14 made of substrates separated by stacking aids, are preferably conveyed by the infeed system 06 and positioned in a defined staging space 07. For example, stack boards 17 or spacer plates 18 can be used as stacking aids. Stack boards 17 can, for example, be inserted into the substrate stack 14 to be further processed during a preceding printing pass to separate individual partial stacks.

In the robot cell 11, a respective partial stack of the substrate stack 14 positioned in the staging space 07 can be gripped, in particular by means of the dual-arm robot 12 or at the at least one workstation, and the gripped substrates of the partial stack can thus be separated from the remaining stack. A partial stack of a partial stack formed, for example, by stack boards 17 can be gripped or handled in the robot cell 11 or at the at least one workstation. However, with suitable dimensioning, it is also possible for an entire partial stack formed by way of stacking aids to be gripped or handled. In connection with the gripping or separation of a partial stack, the individual substrates of the partial stack are preferably separated among each other, for example loosened.

In particular since the individual substrates of the partial stack are separated among one another, the at least one alignment device 31 is preferably arranged downstream from the robot 12 or downstream from the at least one workstation. The at least one alignment device 31 is preferably arranged upstream from at least one printing unit 03 of the sheet processing machine 01 and/or upstream from at least one feeder 02 of the sheet processing machine 01 and/or upstream from at least one unit processing the sheets and/or in an infeed system 06 of the sheet processing machine 01 and/or within the operating zone of the robot cell 11. After a first alignment, for example in the staging space 07, the at least one partial stack is preferably loosened, in particular by an operator or by the robot 12, and then aligned again in the alignment device 31. The at least one partial stack is preferably additionally loosened in the alignment device 31.

The feeder 02 of the processing machine 01 is preferably configured as a non-stop feeder 02, by means of which substrate stacks 14 can be fed to the working machine 01 without interruption for processing. Such a non-stop feeder 02 preferably comprises an auxiliary stack carrier including carrier elements for this purpose, which extend beneath a residual stack through a pallet 16, in particular a non-stop system pallet 16, and lift it for further processing. While the residual stack is being processed, the empty non-stop system pallet 16 is preferably lowered, and a new substrate stack 14 is inserted. For this purpose, for example, a new, in particular fully jogged and/or aligned, substrate stack 14 is inserted on another non-stop system pallet 16 beneath the residual stack and lifted by a stack support plate. In this way, a stack reunion is preferably carried out by way of the non-stop feeder 02, while pulling out the carrier elements of the auxiliary stack carrier. In this way, substrates to be processed are preferably fed to the working machine 01 without interruption.

During operation of the substrate handling system, stacked substrates are preferably fed by means of the infeed system 06 to the robot cell 11, which prepares the substrate stacks 14 for processing by the working machine 01, which further processes, in particular fully automatically, the fed substrates. The robot cell 11 provided between the infeed system 06 and the working machine 01 preferably handles a plurality of substrates in each case using gripper systems 13, wherein selectively differently stacked substrates are fed by the infeed system 06. In the process, the infeed system 06 can feed substrate stacks 14 made of substrates that are stacked without being separated or made of substrates separated by stacking aids.

The gripper system or systems 13 of the robot cell 11, in particular of the dual-arm robots 12, particularly preferably removes or remove stacking aids from fed substrate stacks 14. For this purpose, the stacking aids can be gripped by means of one or both gripper systems 13 of the dual-arm robot 12. The stacking aids can be stack boards 17 and/or spacer plates 18, for example, which in particular mechanically separate different partial stacks of the substrate stack 14 from one another, at least in some areas. The stacking aids, in particular stack boards 17 and/or spacer plates 18, are removed from the substrate stacks 14 containing the stacking aids by means of the gripper system or systems 13 of the robot cell 11, in particular of the dual-arm robot 12. Accordingly, the stacking aids are preferably deposited in a collection space and/or in a collection container.

The stacking aids, such as stack boards 17 and/or spacer plates 18, are preferably sorted out and/or collected. A collection space and/or a collection container can be provided for collection, for example, in which the stacking aids, in particular stack boards 17 and/or spacer plates 18, are deposited by the gripper system or systems 13 of the robot cell 11, in particular of the dual-arm robot 12. The stacking aids, in particular stack boards 17 and/or spacer plates 18, can, for example, be transported to the collection space or into the collection container by means of one or both gripper systems 13 of the dual-arm robot 12. It is also possible, for example, for multiple collection spaces or collection containers intended for different stacking aids to be provided. In this way, it is also possible to separate different stacking aids or different types of stacking aids.

Figure 4:
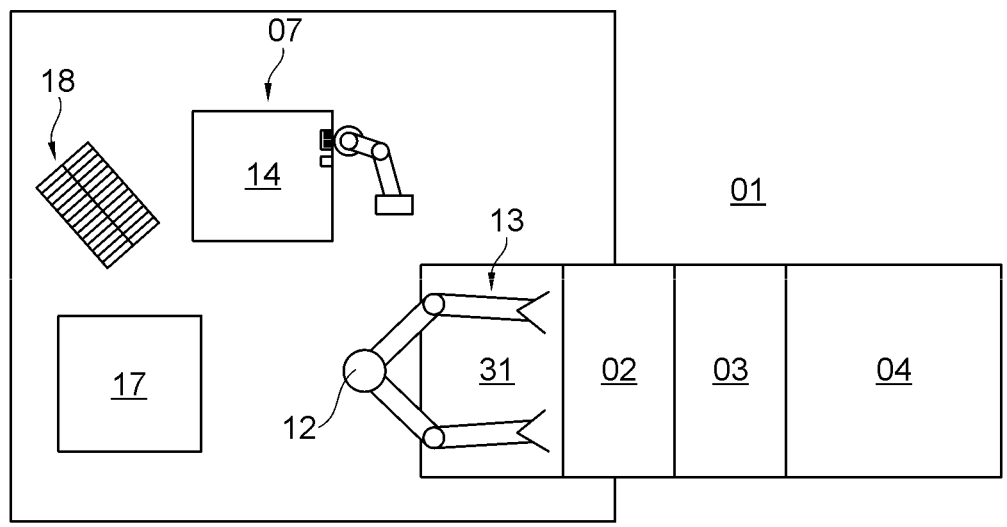
FIG. 4 a system for automatically preparing banknote sheets.

FIG. 4, for example, shows a substrate handling system for automatically preparing in particular banknote sheets in the production process from above. A substrate stack 14 to be processed can be fed to a robot cell 11 by an infeed system 06. The dual-arm robot 12 can handle the substrate stack 14 staged by the infeed system 06 in the staging space 07 by way of its gripper systems 13. Furthermore, a storage area for stack boards 17 and/or a storage area for spacer plates 18 are provided in the handling zone of the dual-arm robot 12. For example, the dual-arm robot 12 can align and/or rotate or turn partial stacks accommodated in the handling zone. For example, gripped partial stacks can be rotated by 180°.

Figure 5:
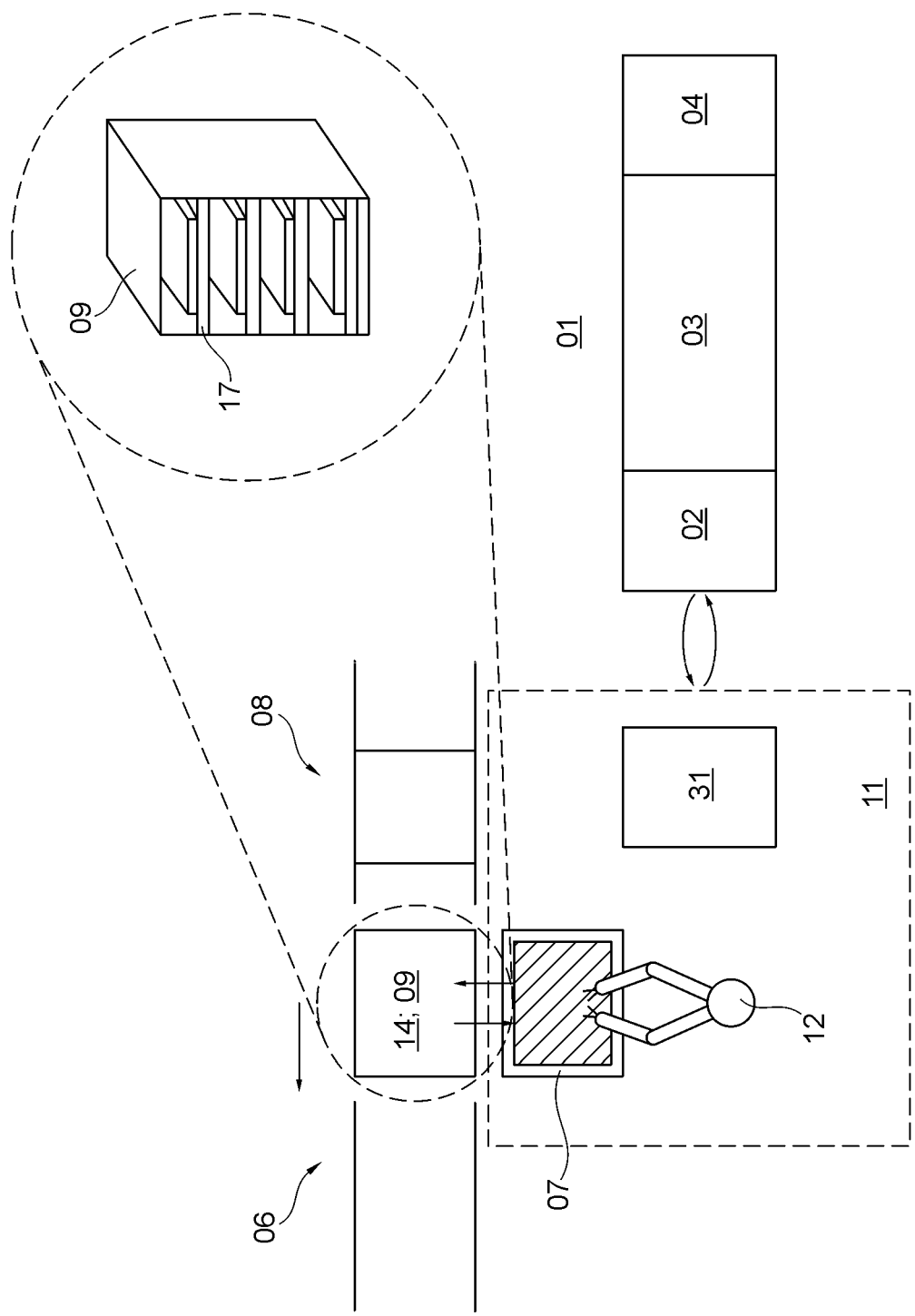
FIG. 5 an infeed system comprising a logistic system for transporting containers containing substrate stacks.

FIG. 5 shows a top view onto an infeed system 06 comprising a logistic system 08, in particular for transporting containers 09 containing substrate stacks 14. The logistic system 08 can comprise conveyor systems, such as conveyor belts, for example, which can displace pallets 16 and/or one or more containers 09. In the process, a pallet 16 or a container 09 can be conveyed by the logistic system 08 to the staging space 07 or be positioned in the staging space 07, in particular in an automated manner.

Such a container 09 can contain substrate sheets to be processed. The container 09 preferably provides partial stacks separated by means of stacking aids, in particular stack boards 17. Loading the container 09 with substrate sheets or with stack boards 17 and partial stacks can be carried out, for example, by the infeed system 06 or upstream, for example manually or in an automated manner. A container 09 thus loaded with stack boards 17 and substrate sheets can be placed onto a conveyor belt, for example. By means of the infeed system 06, this container 09 then moves into the staging position configured as a staging space 07 to the robot cell 11 for automated stack preparation. In the staging space 07, a respective stack board 17, including a respective partial stack, for example consisting of at least 100 to no more than 500 substrate sheets, for example, can be removed, in particular by the dual-arm robot 12. The dual-arm robot 12 preferably removes the partial stack, preferably the substrate sheets, from the stack board 17 and handles and/or manipulates (aerates, loosens, etc.) them. The number of handled sheets is preferably dependent on the thickness of the individual sheets and/or the maximum opening width of the grippers of the gripper system 13 of the robot 12. Afterwards, the dual-arm robot 12 can push the stack board 17 back into the container 09, or also feed it to a collection space or into a collection container.

An empty pallet 16 or an empty container 09 can preferably be transported away or removed by a or the logistic system 08. The logistic system 08 can be configured in such a way that a new pallet 16 or a new container 09 is already being fed. In this way, substrates to be handled can be continuously provided to the robot cell 11, in particular the dual-arm robot 12, on pallets 16 and/or in containers 09.

In particular, a pallet 16 including a substrate stack 14 can be placed, for example by an operator, onto a conveyor belt of the logistic system 08, which feeds the pallet 16 to a positioner, in particular a lifting element, of the staging space 07 for vertical displacement. In particular, the pallet 16 is transported by the logistic system 08 into a lifting frame in the area of the staging space 07. The positioning in the staging space 07 can be carried out depending on the sheet format. In particular, the pallet 16 can be lifted above the lifting frame to a working height for the dual-arm robot 12 or the gripper systems 13. The dual-arm robot 12 in particular removes a defined number of sheets, for example diagonally or at the leading edge, etc., according to a defined gripping pattern. It may likewise be provided that the substrate sheets are secured by way of hold-down elements to prevent sliding, in particular during a counting process or during removal. For example, this can take place by at least one movable hold-down element provided in the area of the lifting frame. The respective uppermost substrate sheet can be fixed from above by one or more hold-down elements, for example.

After gripping the substrate sheets, the dual-arm robot 12 preferably carries out a "loosening and aeration movement" while transporting the substrate sheets to a deposition side. With respect to the dual-arm robot 12, the deposition side is preferably provided, for example, approximately perpendicularly to the staging space 07.

The substrate sheets are preferably deposited in the form of at least one partial stack made of at least two, preferably at least 40 sheets, and/or made of preferably no more than 500 sheets, preferably no more than 200 sheets, in the at least one alignment device 31. The number of sheets is preferably dependent on the thickness of the individual sheets and/or height of the partial stack.

The substrate sheets are deposited onto a non-stop rake, for example after having resided in the at least one alignment device 31. The non-stop rake preferably moves downwardly, in particular when further partial stacks are being deposited. When the substrate stack 14 positioned in the staging space 07 has been processed, the non-stop rake carrying the handled substrate sheets preferably moves onto a new non-stop system pallet 16 located at the bottom. The non-stop rake is preferably lowered vertically, preferably counter to the vertical direction V, until its carrier rods recede into the recesses of the non-stop system pallet 16, so that the substrate sheets are transferred to the non-stop system pallet 16. After a forward carrier beam provided for the non-stop rake has been removed, the non-stop system pallet 16 carrying the substrate sheets to be worked by the working machine 01 can be removed, preferably in an automated manner. In particular, the empty pallet 16 or the empty container 09 on the input-side of the robot cell 11, in particular in the staging space 07, is also removed. For example, empty pallets 16 can be transported beneath the dual-arm robot 12, in particular into a magazine. This can likewise be carried out by the logistic system 08 or an operator.

Figure 6:
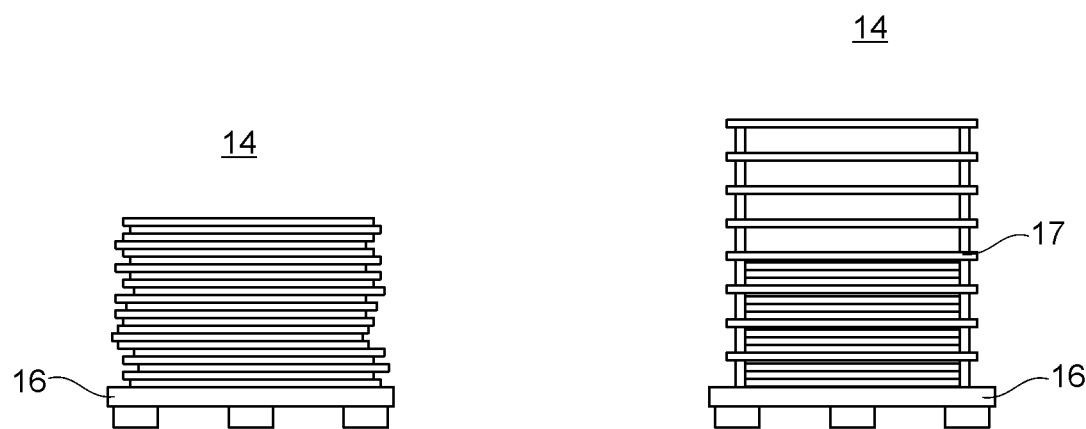
FIG. 6 substrate stacks that can be fed to a substrate handling system.

FIG. 6, for example, shows substrate stacks 14 fed by the infeed system 06 in the substrate handling system on a non-stop system pallet 16. On the left, an unprepared substrate stack 14 is shown, as it can be transported by the infeed system 06 to the robot cell 11 or the workstation. For example, the substrate stack 14 can have oblique or rippled edges and/or include protruding individual or multiple sheets. On the right, a substrate stack 14 formed by sheets, which are indicated by way of example, including stacking aids, is shown. For example, the substrate stack 14 can contain partial stacks separated by stack boards 17 and/or spacer plates 18.

Figure 7:
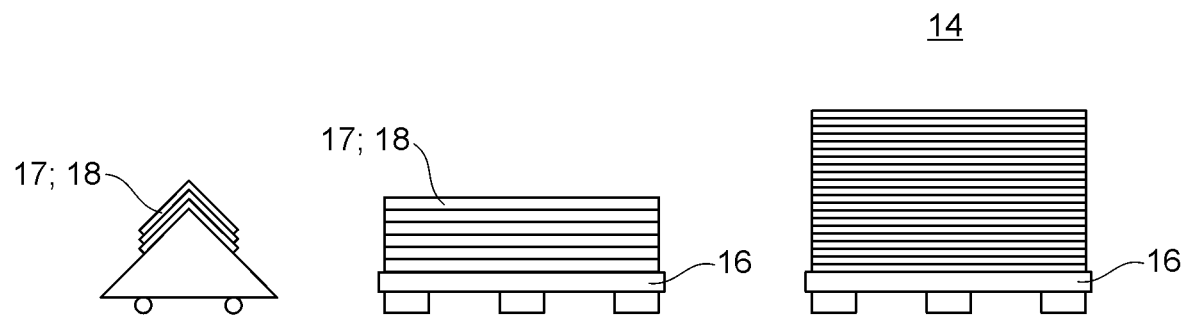
FIG. 7 a substrate stack processed by the substrate handling system and collected stacking aids.

FIG. 7, for example, shows a substrate stack 14 processed by the substrate handling system and collected stacking aids, for example stack boards 17 or spacer plates 18. The processed substrate stack 14 can be staged on a pallet 16 or non-stop system pallet 16 by the robot cell 11 or the operator, or by the working machine 01. The substrate stack 14 can preferably be staged as an aligned substrate stack 14, without inserted stacking aids such as stack boards 17 and/or spacer plates 18. If stacking aids are originally present, these can be kept available by a collection container or a collection space, in particular for reuse. For example, stack boards 17 and/or the spacer plates 18 can likewise be collected on a pallet 16. The stack boards 17 and/or the spacer plates 18 can, for example, additionally or alternatively be staged in a storage area. Using a logistic or transport system, the finished substrate stacks 14 and/or the collected stacking aids, in particular stack boards 17 stacked, for example, on a pallet 16 and/or spacer plates 18 collected, for example, in a container, can be displaced or transported in an automated manner.

A new substrate stack 14 is delivered into the substrate handling system by the infeed system 06 in the defined staging space 07. The substrate stack 14 can have been generated or formed by a further working machine, for example as described above. Preferably, partial stacks are gripped by the robot cell 11 from the fed substrate stacks 14 while the substrate stack 14 is being handled, and the substrates of the particular partial stack are handled, in particular separated and/or loosened and/or aerated. In the process, a fed substrate stack 14 can also be detected by way of sensors in the substrate handling system and handled corresponding to the sensor values. The robot arms or gripper systems 13 of the robot cell 11, in particular of the dual-arm robot 12, are preferably controlled by open-loop or closed-loop control as a function of the ascertained fed substrate stacks 14 in accordance with predefined handling instructions.

Substrate stacks 14 placed in the defined staging space 07 preferably undergo an incoming stack inspection by preferably optical measuring systems, if necessary, following a release signal or start signal. For example, the geometry of the substrate stack 14 can be checked (format and/or size of the container and/or height and/or ripples, etc.) and/or the stack quality can be checked (e.g., for protruding sheets). The geometry of the substrate stack 14 can be detected by means of an optical measuring system, for example by means of a camera, in particular a 3D camera, and/or a laser scanner, and be compared to an ideal. If the deviations are greater than defined, the relevant substrate stack 14 can be rejected by the system or not be released for processing. Additionally, it is possible for the system to process the substrate stack 14 up to the point or position that deviates from the ideal, and to then notify the operator, so as to solve the problem at hand (e.g., in the case of a protruding single sheet). Afterwards, the substrate stack 14 can then be further processed by the system.

In the process or in this context, a sheet detection can preferably be carried out, preferably by transmitting ascertained data to the robot cell 11 and/or the working machine 01, in particular a printing press. Particularly preferably, the upper substrate sheet can be identified, if necessary, by ascertaining an associated lot number. This can in particular result in knowledge about all sheets or substrates present in the current lot. This information is preferably transmitted to the working machine 01, for example the printing press, in particular when it is connected inline. As an alternative or in addition, data can be stored, for example for documentation purposes, in particular in the system.

Furthermore, sheets or substrates can be counted. The counting of sheets can in particular be carried out mechanically. The substrate sheets can be counted to a previously set value by means of a mechanical feeler, which is attached to a linear axis or a robot arm or a gripper system 13 or a separate arm. For example, an exact number of substrate sheets can be necessary during final processing. This is carried out, in particular, by way of mechanical vacuum counting disks 21 and cannot be carried out by indirect measurement (stack height, visual features, etc.). Moreover, this counting can be used for the purpose of seamlessly tracing the substrates or print substrates.

Figure 8:
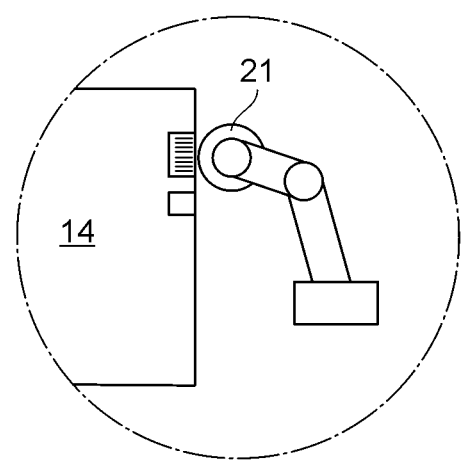
FIG. 8 a vacuum counting disk for counting substrate sheets.

FIG. 8, for example, shows a vacuum counting disk 21, which can be used in the substrate handling system, in particular in the robot cell 11, for counting the exact number of substrate sheets. In this connection or at the same time, a feature, such as a lot number, associated with the substrate stack 14 can be identified by way of a measuring system.

The substrate sheets can be separated from the substrate stack 14 by means of the gripper systems 13 in such a way that a number of precisely counted substrate sheets is separated from the substrate stack 14 and subsequently gripped. For a counting process, for example a gap can be formed in the substrate stack 14, wherein in particular a plate, configured in a wedge shape for example, can separate a partial stack from the main stack. The partial stack to be counted can also rest on the plate across the entire sheet width during the counting process. Afterwards, the defined number of substrate sheets can be counted by way of a measuring system, in particular the vacuum counting disk 21, and preferably be separated, or be segregated for gripping. If no counting took place, an approximate number of substrate sheets can be removed or gripped. However, this amount can also be ascertained, e.g., by optical height measurement.

Depending on the fed substrate, a movement, in particular previously defined by the operator, can be carried out with the substrate sheets in the robot cell 11, in particular by the dual-arm robot 12. This movement can in particular be used to break up or free the substrate sheets. For example, such information can be ascertained from the detected features, such as the lot number.

Figure 9:
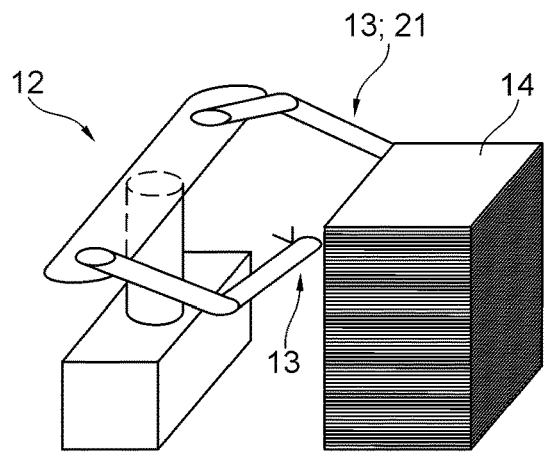
FIG. 9 a dual-arm robot comprising an interchangeable gripper.

For example, a vacuum counting disk 21, serving as the interchangeable gripper, is arranged directly at the robot 12 or at a robot arm. Accordingly, the vacuum counting disk 21 can be activated or brought into position, so that the dual-arm robot 12, together with the vacuum counting disk 21, can move into the substrate stack 14, as is shown in FIG. 9, for example. The vacuum counting disk 21 or the robot arm stops after a defined number of substrate sheets. Thereafter, for example, the substrate stack 14 can move downwardly, or the robot arm, together with the vacuum counting disk 21, moves upwardly in such a way that a gap arises as a result of the relative movement. Thereafter, one gripper system 13, for example the opposite gripper system 13 of the dual-arm robot 12, can reach into the substrate stack 14 and handle the counted partial stack. During this time, the arm of the dual-arm robot 12 comprising the interchangeable gripper can change the tool, for example using a gripper revolver situated at the arm or externally, and continue with the separation.

Figure 10:
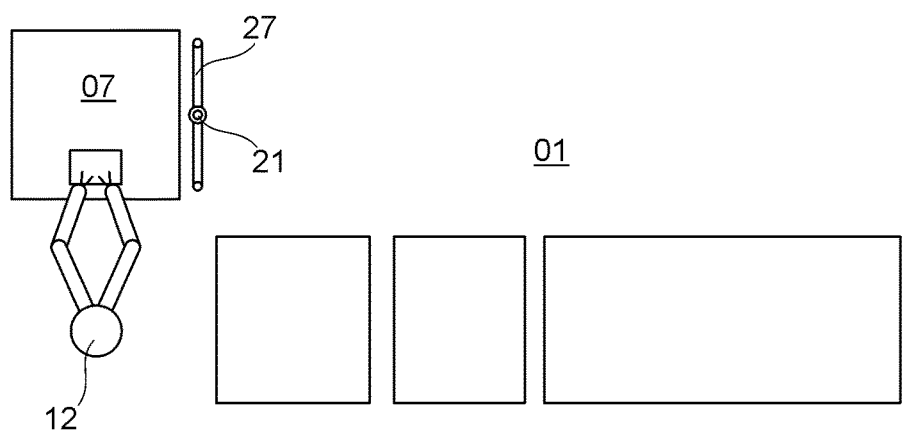
FIG. 10 a top view onto a robot cell comprising a vacuum counting disk arranged at a frame.

In an alternative embodiment, the vacuum counting disk 21 is arranged, for example, at a frame 27, as is shown in FIG. 10, for example. The frame 27 can be provided adjoining the staging space 07, for example, and be rigidly or movably configured. For example, the frame 27 can include one or more linear axes for movably accommodating a vacuum counting disk 21.

Figure 11:
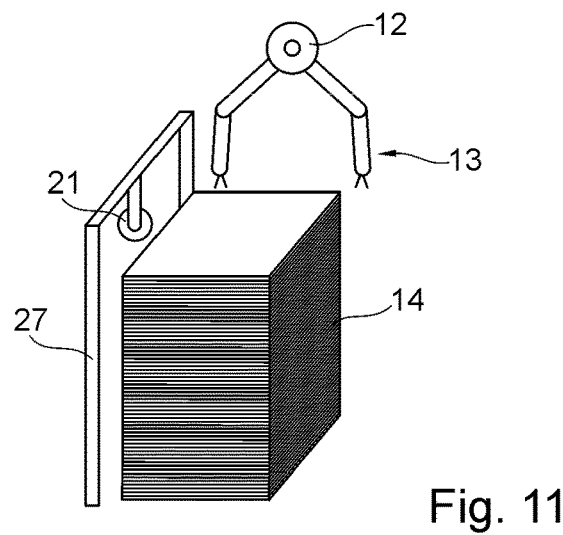
FIG. 11 a vacuum counting disk arranged at a frame.

FIG. 11 shows a vacuum counting disk 21 arranged at the frame 27 for counting the substrate sheets of the substrate stack 14. The vacuum counting disk 21 is attached to the outside of the frame 27 or mount. The movable vacuum counting disk 21 moves into the substrate stack 14 until a defined number of substrate sheets has been reached. Thereafter, the mechanical feeler inserted between two immediately adjoining substrate sheets moves upwardly a certain distance and/or the substrate stack 14 is moved downwardly a certain distance, in such a way that a gap arises as a result of the relative movement. Thereafter, one gripper system or both gripper systems 13 of the dual-arm robot 12 can reach into the substrate stack 14 and grip and handle the counted partial stack.

Figure 12:
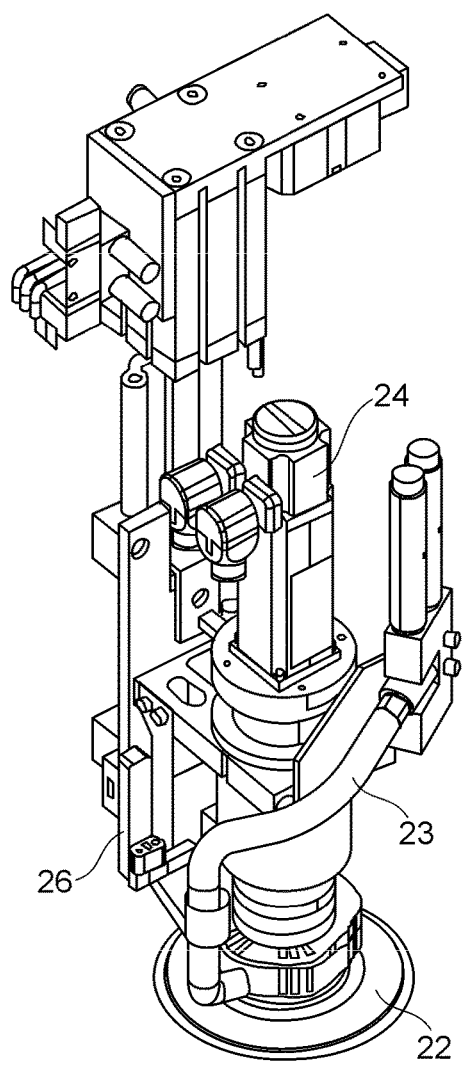
FIG. 12 perspective views of a vacuum counting disk.
Figure 12:
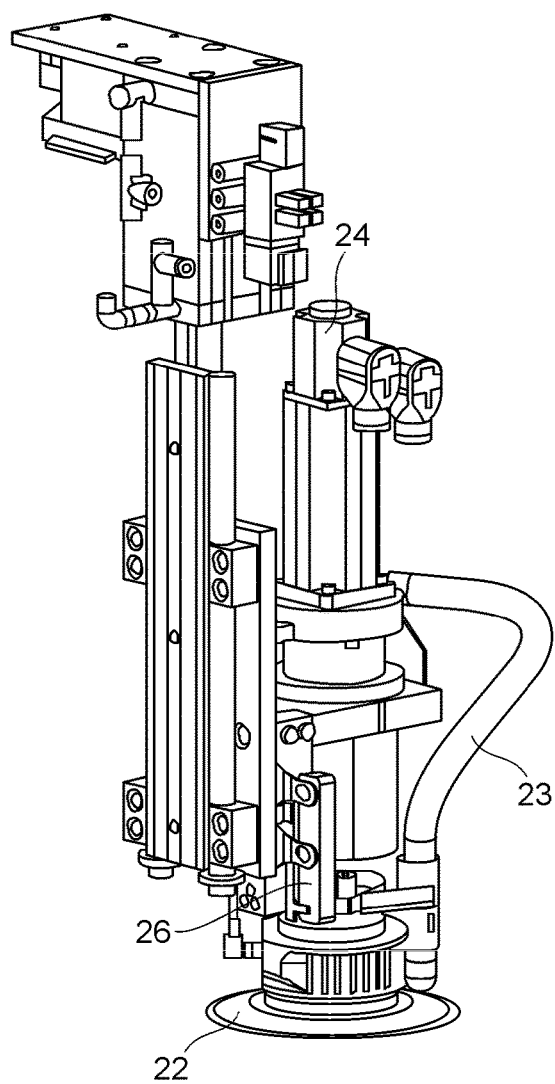

FIG. 12 shows perspective views of a vacuum counting disk 21 for counting the exact number of sheets of the substrates to be handled. The exact number of sheets of the substrates is counted by means of a mechanical feeler, in particular a counting disk 22, moving between the substrates, and, when a sufficient or intended number has been reached, the substrates are separated so as to form a gap. The vacuum counting disk 21 can be provided at an arm of the dual-arm robot 12 or at the separate frame 27, or also at a separate arm.

A vacuum counting disk 21 can comprise a motor 24, for example, which rotatorily drives the counting disk 22. Negative pressure can be supplied to the counting disk 22 by means of a vacuum hose 23, which is used on the underside of the counting disk 22 to apply suction to and lift the uppermost substrate sheet. The rotatorily driven counting disk 22 has at least one specific recess, which is not shown in greater detail, at its circumferential edge so as to individually pick up each substrate sheet while rotating. In the process, the counting disk position is determined, in particular by way of a measuring device 26. Since the counting disk 22 extends beneath each substrate sheet individually during the counting process, a gap can be generated at a defined number of substrate sheets for handling the counted partial stack by the dual-arm robot 12.

Figure 13:
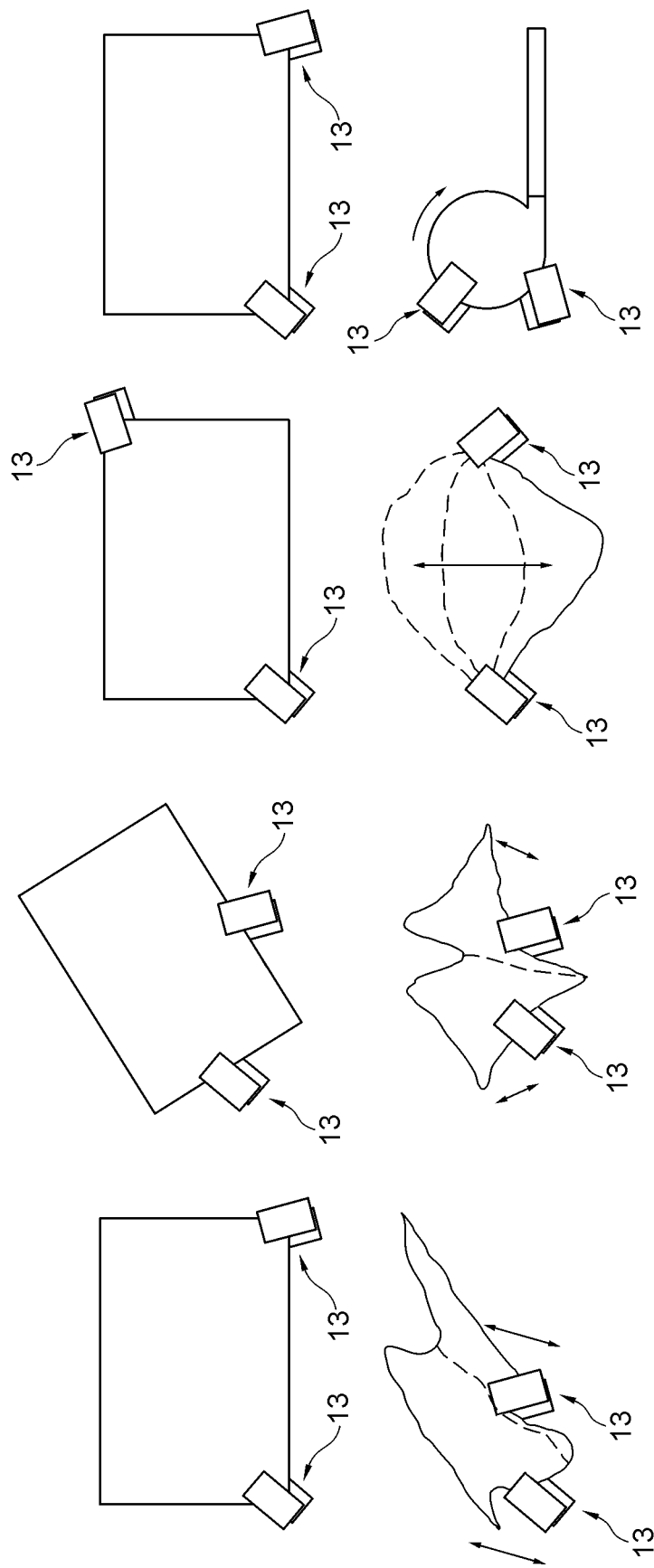
FIG. 13 handling steps for substrate sheets by gripper systems of a dual-arm robot.
Figure 14:
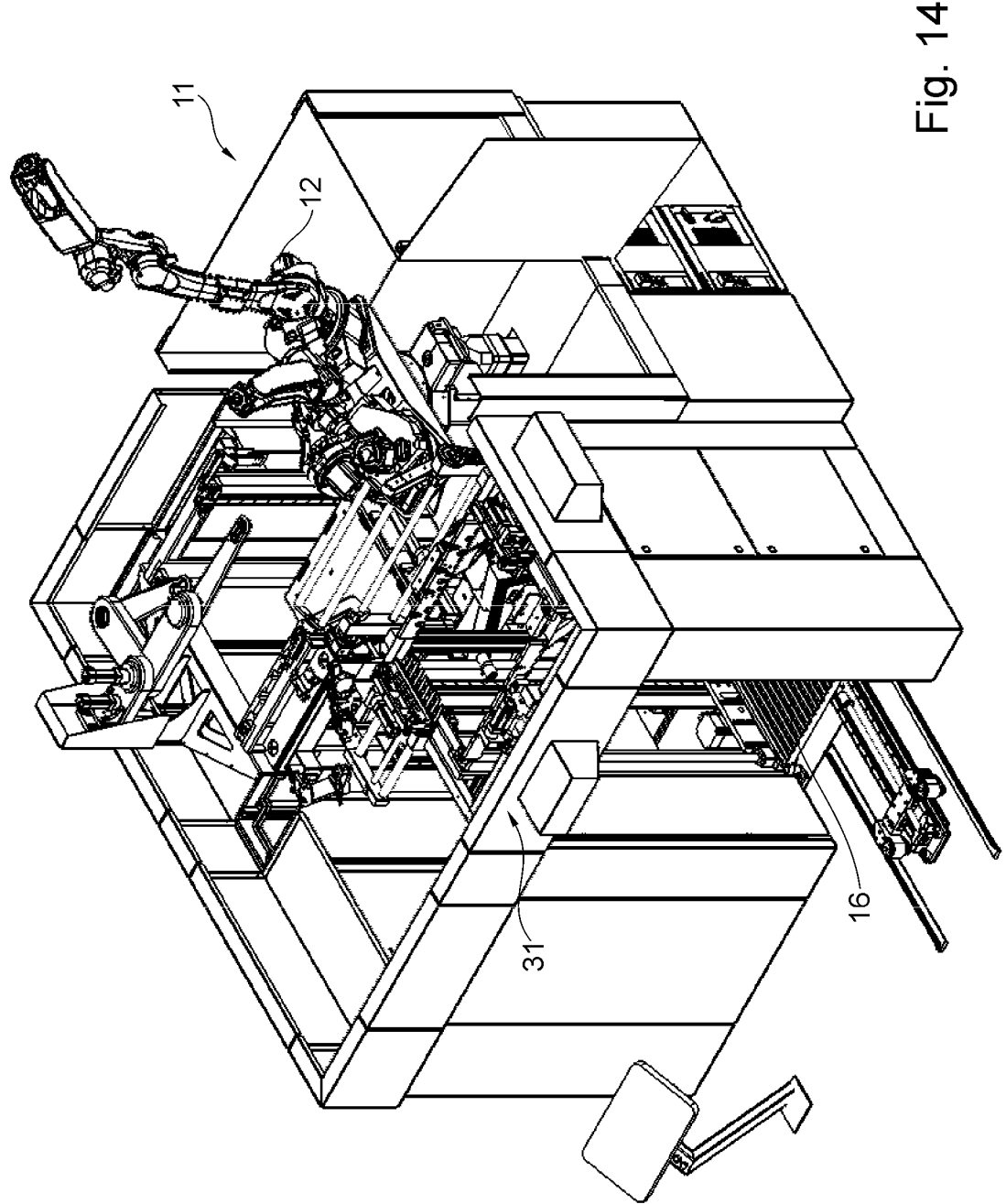
FIG. 14 a robot cell comprising at least one robot and at least one alignment device in a three-dimensional view.
Figure 15:
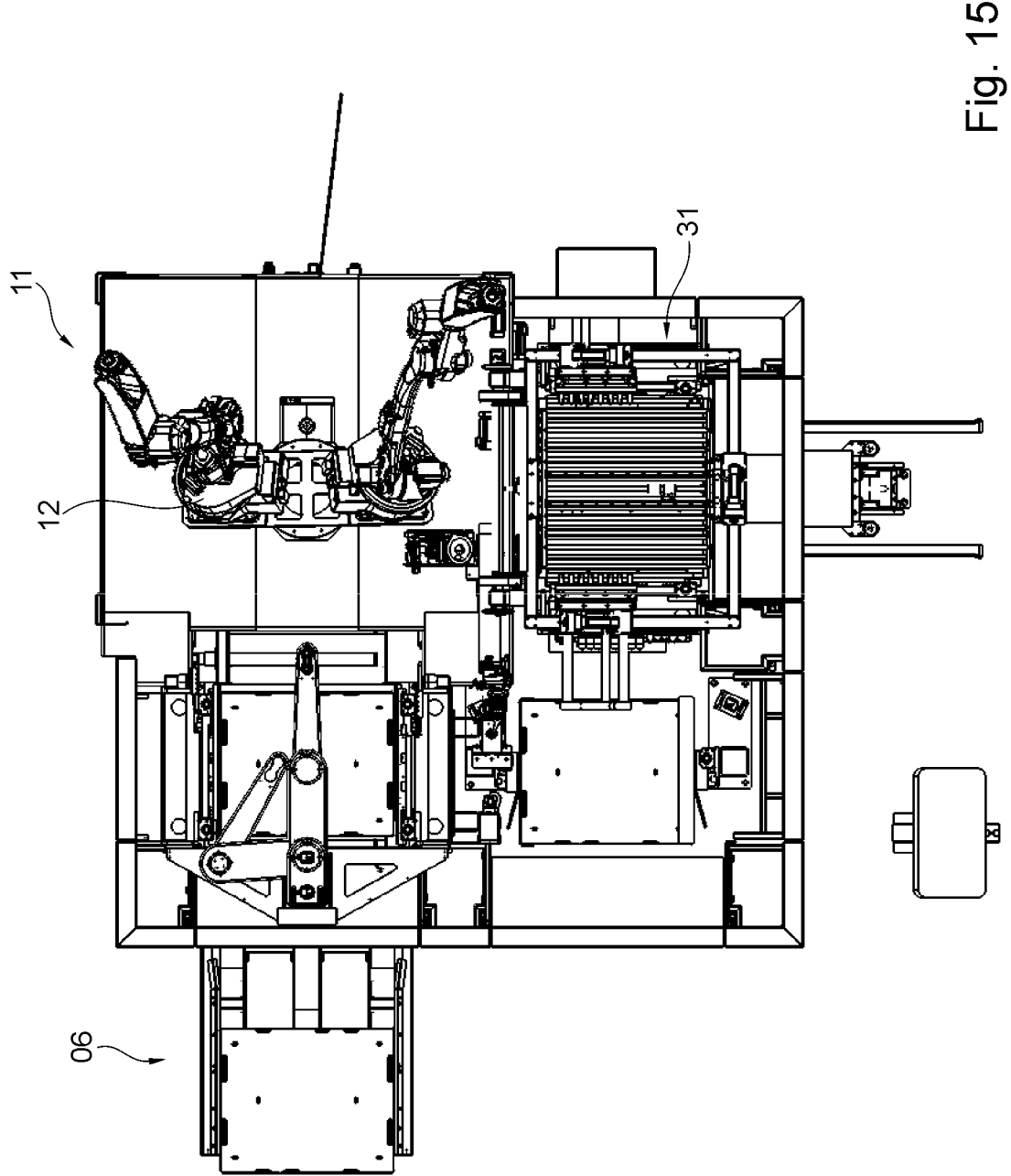
FIG. 15 the robot cell from FIG. 14 in a top view.
Figure 16:
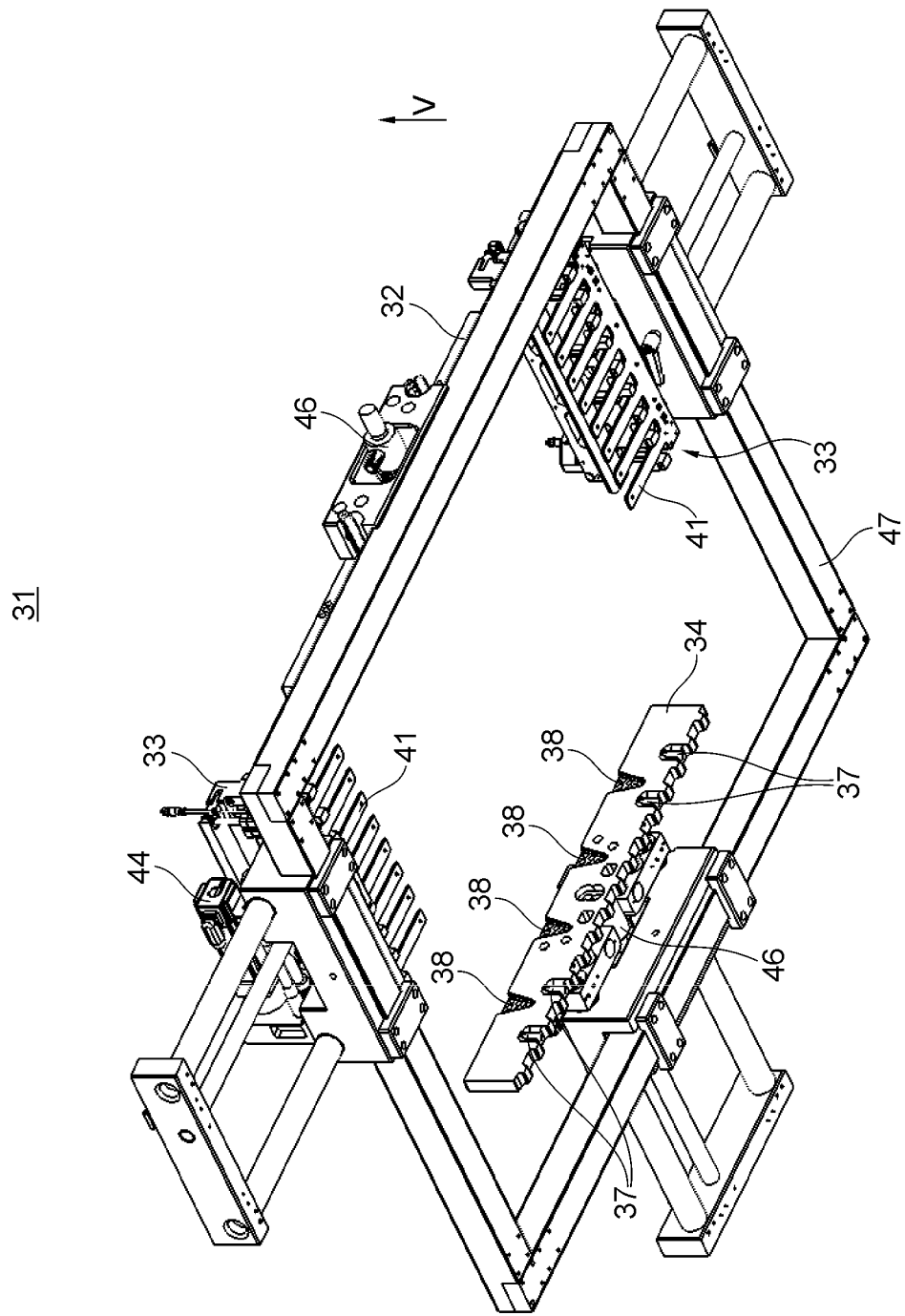
FIG. 16 another exemplary alignment device for the alignment device shown in FIG. 3, comprising at least four stops, in a three-dimensional view from beneath, with two lateral stops each comprising a support element.
Figure 17:
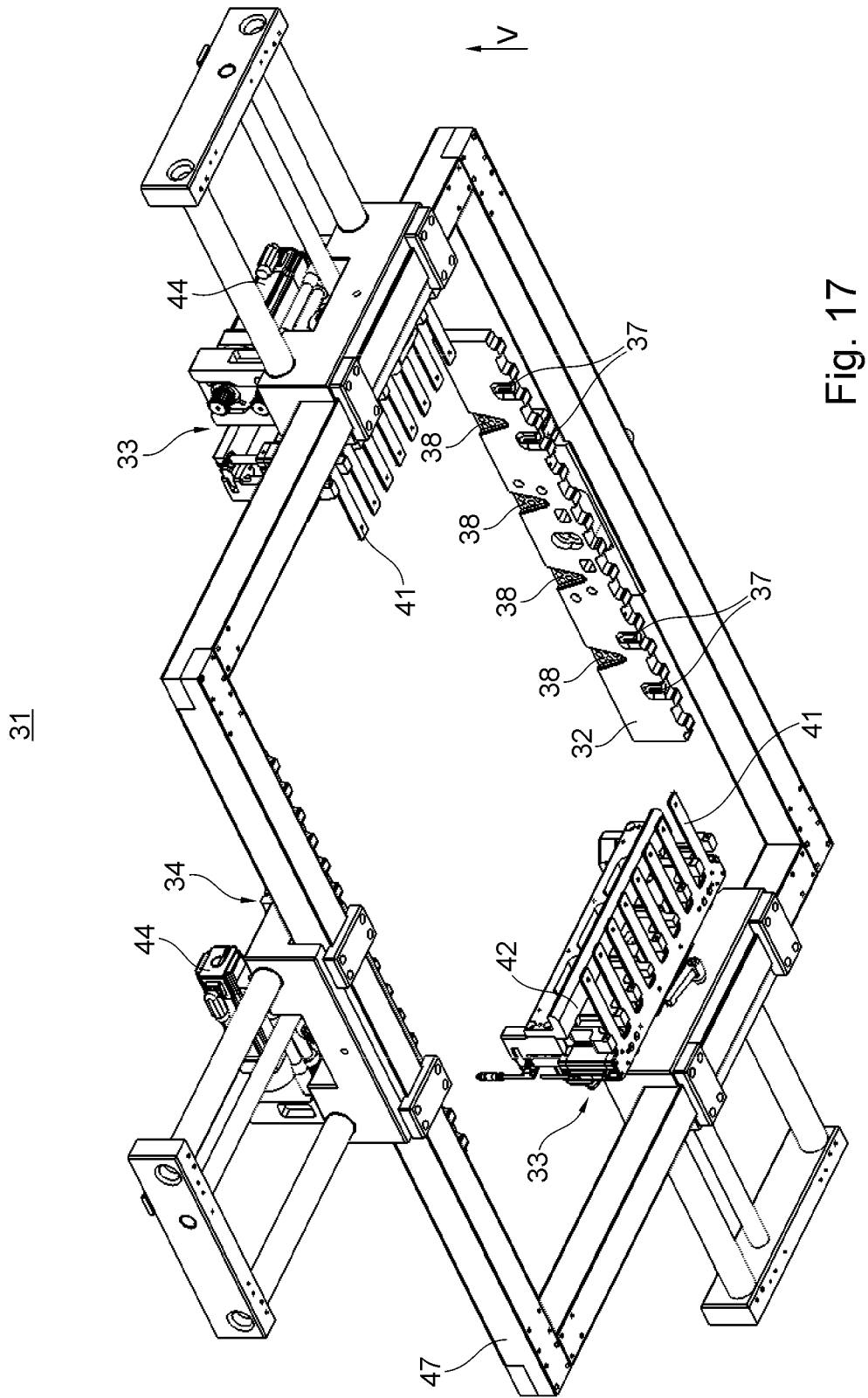
FIG. 17 the alignment device corresponding to FIG. 16, comprising at least four stops, in a further three-dimensional view from beneath.
Figure 18:
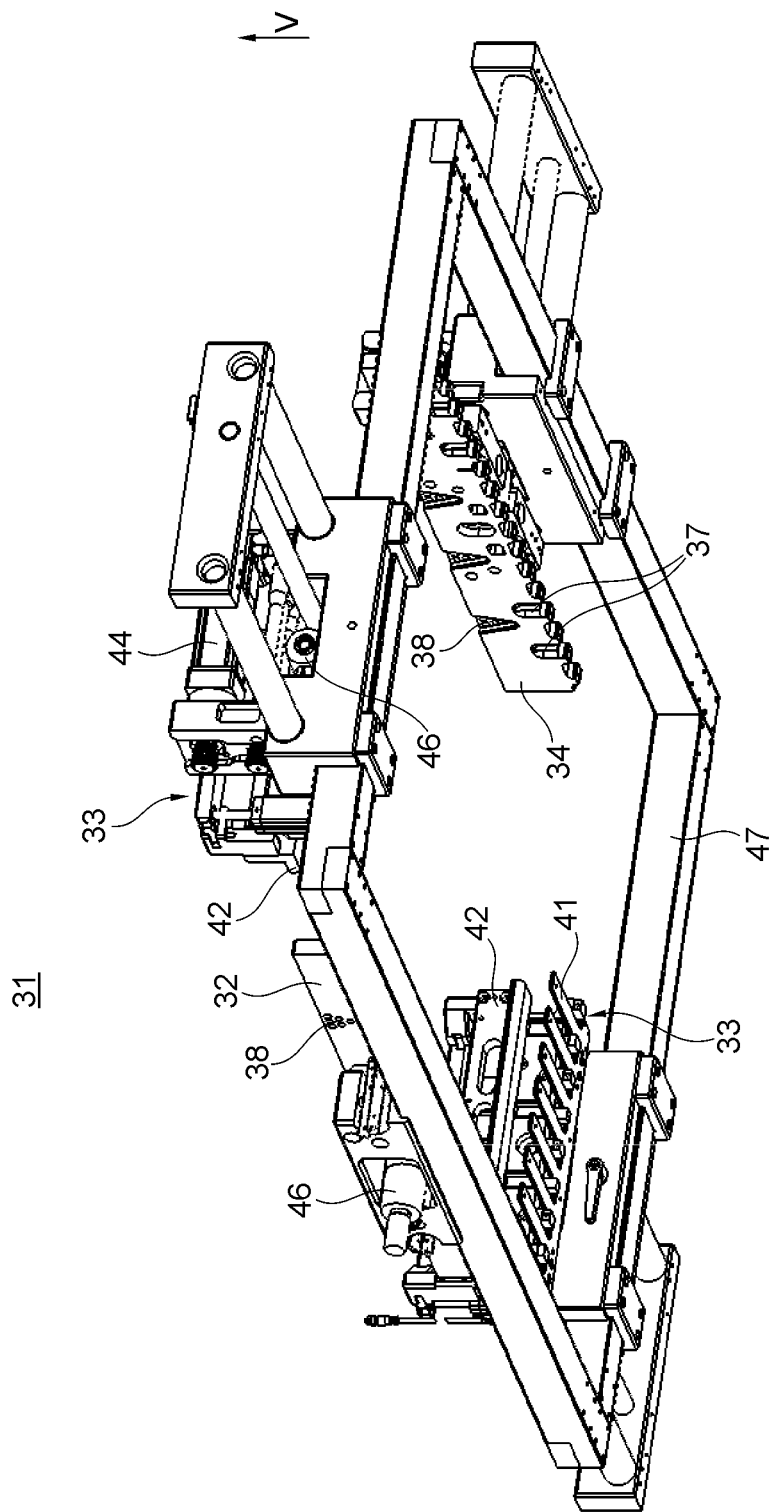
FIG. 18 the alignment device corresponding to FIG. 16 or FIG. 17, comprising at least four stops, in a further three-dimensional view from beneath.
Figure 19:
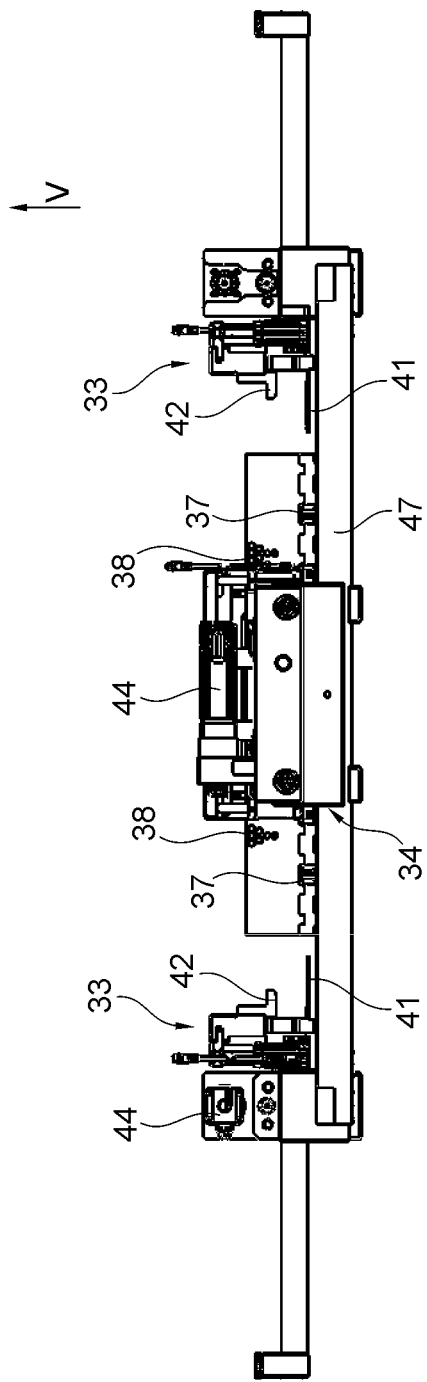
FIG. 19 the alignment device corresponding to FIG. 16, FIG. 17 or FIG. 18, comprising at least four stops, in a side view.

FIG. 13 shows several movements of the dual-arm robot 12 that can be carried out for different applications and substrates. The selection of movements to be carried out can be predefined, for example, or be inferred from measured values. Additionally, the substrate sheets can be moved vertically through a configuration of two parallel tubes prior to being deposited, which preferably continuously bends the defined number of substrate sheets during the upward movement from the front and back, in particular alternately. The resulting relative movement between the individual substrate sheets can thus represent another separation step.

Furthermore, the substrate sheets can also be aerated, for example while the substrate sheets are being freed by the gripper systems 13 of the dual-arm robot 12. In particular, air can be blown between the substrate sheets while the substrate sheets are being freed by the defined movement by means of the gripper systems 13 of the dual-arm robot 12. The layer of substrate sheets "floats" as a result of the substrate sheets only being held at two defined points by the gripper systems 13.

A deposition, collection and alignment of the substrate sheets is preferably carried out by depositing the gripped partial stacks in the at least one alignment device 31. This ensures that the substrate sheets are positioned true to register on a pallet 16 or non-stop system pallet 16 that is arranged downstream from the alignment device 31 in the conveying direction F. The substrate sheets are preferably collected and aligned in the alignment device 31 in at least one partial stack of preferably at least 40 sheets, more preferably of at least 100 sheets, more preferably of at least 150 sheets. For example, the substrate sheets are collected and aligned in the alignment device 31 in at least one partial stack of preferably no more than 500 sheets, more preferably of no more than 300 sheets, more preferably of no more than 250 sheets. The number of sheets is preferably dependent on their thickness and/or the height of at least one stop 32; 33; 34 of the alignment device 31.

Preferably, sheets of at least two partial stacks are collected, and at least one ream is formed, in the conveying direction F downstream from the at least one alignment device 31, preferably directly subsequent thereto, more preferably without a further processing or working device therebetween. In the present case, the ream preferably encompasses at least 50, preferably at least 200, more preferably at least 400 sheets and/or no more than 700, preferably no more than 600, more preferably no more than 500 sheets. For example, at least two reams are collected, whereby a substrate stack 14 of at least 1,000 (one thousand) sheets, preferably of at least 2,000 sheets, and/or of no more than 10,000 sheets, preferably of no more than 8,000 sheets is formed. Afterwards, the collected substrate sheets are preferably transferred onto a pallet 16 or non-stop system pallet 16, and the pallet 16 or non-stop system pallet 16 or the formed substrate stack 14 is fed into the feeder 02 or non-stop feeder 02 of the working machine 01. This can be carried out without further manipulation by the operator for the direct stack change in the feeder 02 or non-stop feeder 02 of the working machine 01, in particular printing press or final processing machine, for example for cutting and/or inspection.

The substrate handling system comprises the at least one alignment device 31 and the at least one sheet processing machine 01. At least one partial stack of substrate is at least temporarily deposited and/or loosened and/or aligned in the at least one alignment device 31.

Above and below, aligning describes, in particular, that the edges of at least one substrate are positioned in a position that is established, for example, by at least one stop 32; 33; 34. In addition or as an alternative, the alignment preferably describes that at least two, in particular sheet-format, substrates are arranged on top of one another, and preferably exactly on top of one another. An aligned partial stack, for example, preferably includes a plurality of sheets, which are preferably arranged exactly on top of one another, i.e., in the same position in terms of their length and width. Above and below, loosening describes, in particular, that individual sheets of the partial stack can be detached and/or separated from one another, in particular without adhering to at least one further sheet of the partial stack.

The at least one alignment device 31 is preferably arranged, in the conveying direction F, upstream from the sheet processing machine 01, in particular upstream from the at least one printing unit 03 of the sheet processing machine 01 and/or upstream from the at least one feeder 02 of the sheet processing machine 01 and/or upstream from the at least one unit processing the sheets and/or in the infeed system 06 of the sheet processing machine 01 and/or within the operating zone of the robot cell 11.

Preferably, the at least one robot 12 is arranged so as to adjoin the at least one alignment device 31, wherein the at least one robot 12 is configured to feed a plurality of sheets, in particular at least one partial stack of sheets, to the at least one alignment device 31. For example, the at least one alignment device 31 is arranged within the robot cell 11 for this purpose. For example, as an alternative, an operator is trained to feed at least one sheet, preferably a plurality of sheets, in particular at least one partial stack of sheets, for example at least one substrate stack 14, to the at least one alignment device 31.

Preferably, at least one pallet 16 and/or at least one fork system and/or at least one plate and/or at least one object at least temporarily generating a bottom are arranged beneath the at least one alignment device 31 and/or beneath at least one support element 41 and/or beneath an alignment plane, without further elements or devices therebetween.

The at least one alignment device 31 comprises at least four stops 32; 33; 34. The at least one alignment device 31 preferably comprises exactly four stops 32; 33; 34.

The alignment device 31 preferably comprises at least three stops, at least one rear stop 34 and at least two lateral stops 33. At least one stop 32 is configured as a front stop 32, and at least one stop 34 is configured as a rear stop 34, and at least two stops 33 are in each case configured as lateral stops 33. The alignment device 31 preferably comprises exactly one front stop 32 and exactly one rear stop 34 and exactly two lateral stops 33.

For example, the at least one front stop 32 is assigned to a first edge of at least one sheet, for example of the at least one partial stack. The front stop 32 is preferably assigned to a leading edge of at least one sheet, for example of the at least one partial stack. The leading edge is preferably an edge of the sheet that corresponds to the first edge of the sheet along a direction in which the at least one sheet is transported by the sheet processing machine 01. For example, the at least one rear stop 34 is assigned to a second edge of at least one sheet, for example of the at least one partial stack. The rear stop 34 is preferably assigned to a trailing edge of at least one sheet, for example of the at least one partial stack. The trailing edge is preferably an edge of the sheet that corresponds to the last edge of the sheet along a direction in which the at least one sheet is transported by the sheet processing machine 01. For example, the at least two lateral stops 33 are each assigned to a third edge, preferably side edge, of at least one sheet, for example of the at least one partial stack. The side edge is preferably in each case situated orthogonal to the direction in which the at least one sheet is transported by the sheet processing machine 01.

For example, at least one of the stops 32; 33; 34 is subdivided. This means that the at least one stop 32; 33; 34 has at least two, preferably at least three units that differ from one another, for example are spatially separated. The units that differ from one another preferably form the at least one stop 32; 33; 34. For example, all units of a stop 32; 33; 34 are arranged one behind the other along a straight line, for example along one side of a frame 47 of the alignment device 31. For example, all units of a stop 32; 33; 34 are assigned to the same edge of the at least one partial stack of sheets and/or arranged one behind the other along an edge of a sheet arranged in the alignment device.

At least two stops 32; 33; 34 at a time are arranged opposite one another. The at least one front stop 32 and the at least one rear stop 34 are arranged opposite one another. The at least two lateral stops 33 are arranged opposite one another. Preferably, each of the at least two lateral stops 33 is arranged orthogonally to the at least one front stop 32 and/or the at least one rear stop 34. As an alternative, for example, in particular in the case of a non-right-angled format of the sheets, the at least two lateral stops 33 have an angle not equal to 90° (ninety degrees), for example at least 30° and/or no more than 80°, in particular consistent with the particular format of the sheets, with respect to the at least one front stop 32 and/or with respect to the at least one rear stop 34.

The at least four stops 32; 33; 34 are preferably arranged in an alignment plane. The alignment plane preferably corresponds to a plane, with a bottommost sheet of the at least one partial stack to be aligned by the alignment device 31 being arranged in the alignment plane during its positioning in the alignment device 31.

Preferably, a lower delimitation of the respective stop 32; 33; 34, which is spanned by a length and a width of the respective stop 32; 33; 34 and generates a base area, is situated in the alignment plane. At least one stop 32; 33; 34, preferably each, of the at least four stops 32; 33; 34 preferably has the base area. The base area preferably corresponds to a lower delimitation of the at least one stop 32; 33; 34 in the vertical direction V. The lower delimitation preferably corresponds to the maximum extension of the at least one stop 32; 33; 34 of the at least four stops 32; 33; 34 counter to the vertical direction V. Preferably in addition or as an alternative, the lower delimitation is preferably spanned in a plane orthogonal to the height of the at least one stop 32; 33; 34 of the at least four stops 32; 33; 34 by the length and the width of the at least one stop 32; 33; 34. The base area of the at least one stop 32; 33; 34 of the at least four stops 32; 33; 34 is preferably situated in the alignment plane. Preferably in addition or as an alternative, the alignment plane is spanned by the base area. More preferably, the base areas of the at least four stops 32; 33; 34 are situated in the alignment plane and/or the alignment plane is spanned by the base areas.

At least one stop 32; 33; 34, preferably each, of the at least four stops 32; 33; 34 preferably has a length and a width and a height. The height preferably corresponds to an extension of the at least one stop 32; 33; 34 in one direction, the direction of the height having a largest component in the vertical direction V. The length and width are preferably situated orthogonally to the height. The length preferably corresponds to a longest extension of the at least one stop 32; 33; 34 orthogonal to its height. The width preferably corresponds to a shortest extension of the at least one stop 32; 33; 34 orthogonal to its height. In particular, the height of the at least four stops 32; 33; 34 is preferably in each case situated orthogonally to the alignment plane. Preferably, the at least four stops 32; 33; 34 in each case have an extension that, in their height, is in each case at least twice as large as in their width. Preferably in addition or as an alternative, the alignment plane is a horizontal plane. Preferably in addition or as an alternative, the base area of the at least four stops 32; 33; 34 is in each case permanently situated in the horizontal alignment plane.

The at least one front stop 32 is preferably configured to be fixed in its position. Preferably, the at least one front stop 32 is configured to be fixed in its position within the alignment plane. More preferably, the at least one front stop 32 is configured, in particular, so as to be non-linearly movable and/or so as to non-linearly move within the alignment plane. The at least one front stop 32 preferably has a permanently constant distance with respect to the frame 47 of the alignment device 31. In this way, preferably at least one drive, for example at least one drive 44 generating a movement that differs from a vibration or an oscillating movement, more preferably a linear movement, is saved.

Preferably, the at least four stops 32; 33; 34 are arranged on the at least one frame 47 of the alignment device 31. Preferably, at least one stop 32; 33; 34, preferably at least two stops 32; 33; 34, more preferably at least three stops 32; 33; 34, more preferably all stops 32; 33; 34, of the at least four stops 32; 33; 34 are connected to the at least one frame 47 by at least one vibration damper. In this way, the transfer of vibrations and/or oscillating movements of the respective stop 32; 33; 34 onto the at least one frame 47 is preferably reduced and/or minimized, preferably eliminated.

Preferably, at least one stop 32; 33; 34 is in each case arranged on a respective side of the at least one frame 47 of the alignment device 31. The at least one front stop 32 is preferably arranged on a side of the at least one frame 47 which is situated opposite the at least one rear stop 34. At least one of the at least one two lateral stops 33 is preferably arranged on a side of the at least one frame 47 which is situated opposite the at least one further lateral stop 33. Preferably, the at least four stops 32; 33; 34 enclose an area in which the at least one partial stack is deposited.

At least one of the at least four stops 32; 33; 34 preferably includes at least one blower device including at least one nozzle 37 that ejects fluid, preferably air. At least two of the at least four stops 32; 33; 34 preferably in each case include the at least one blower device. In particular, the at least one front stop 32 and/or the at least one rear stop 34 preferably each include the at least one blower device. More preferably, at least three, more preferably at least four, stops 32; 33; 34 in each case include the at least one blower device.

Preferably, the at least one blower device is configured to generate at least one air cushion beneath a bottommost sheet of the at least one partial stack. Preferably in addition or as an alternative, the at least one blower device is configured to separate individual sheets of the at least one partial stack from one another by blown-in fluid. This advantageously supports the loosening of the at least one partial stack while it is arranged in the alignment device 31. Preferably in addition or as an alternative, the at least one blower device of the at least one stop 32; 33; 34 is configured to push and/or drive the at least one partial stack to at least one further stop of the stops 32; 33; 34, in particular to the at least one front stop 32, which is preferably fixed in its position, and/or at least one lateral stop 33, which is preferably at least temporarily fixed.

The at least one stop 32; 33; 34 including the at least one blower device preferably comprises at least two nozzles 37, more preferably at least four nozzles 37, more preferably exactly four nozzles 37. Preferably, the at least one nozzle 37, preferably the at least two nozzles 37, more preferably the at least four nozzles 37, are arranged in an area, the area being spanned by the length and height of the at least one stop 32; 33; 34. Preferably, the at least two nozzles 37, preferably the at least four nozzles 37, are arranged one behind the other along the length of the at least one stop 32; 33; 34. Preferably, the at least one nozzle 37, preferably the at least two nozzles 37, more preferably the at least four nozzles 37, are each arranged in a bottom third of the height of the at least one stop 32; 33; 34. In this way, the at least one nozzle 37, preferably the at least two nozzles 37, more preferably the at least four nozzles 37, are preferably configured to eject fluid in particular in the direction of the bottommost sheet of the at least one partial stack. For example in addition or as an alternative, at least one first nozzle 37 of the blower device, for example at least one first nozzle 37 of the at least two nozzles 37, is arranged in a central and/or top third of the height of the at least one stop 32; 33; 34, wherein at least one second nozzle 37 of the blower device is preferably arranged in the bottom third of the height of the at least one stop 32; 33; 34. In this way, fluid can preferably be ejected at varying heights into the at least one partial stack.

Preferably, the at least one nozzle 37 is, preferably the at least two nozzles 37 are, configured to eject fluid, preferably air, with at least a first velocity or at least a second velocity. The first velocity preferably differs from the second velocity. Preferably, the velocity with which the at least one nozzle 37 ejects, preferably the at least two nozzles 37 eject, the fluid can be adapted and/or can be changed and/or is changed and/or is adapted, in particular, as a function of the number of sheets in the at least one partial stack and/or of the thickness of the sheets and/or of the format size of the sheets.

Preferably, the at least one nozzle 37 has, preferably the at least two nozzles 37 have, a discharge direction of the ejected fluid, in particular of the air, having at least one component, the component being directed parallel to a surface normal of the area spanned by the length and the height of the at least one stop 32; 33; 34 with the at least one blower device. Preferably, the discharge direction of the at least one nozzle 37, preferably of the at least two nozzles 37, is preferably directed with at least one component of the discharge direction at the at least one opposing stop 32; 33; 34 and/or at a partial stack of substrate arranged in the alignment device 31. Preferably, the discharge direction of the at least one nozzle 37, preferably the discharge directions of the at least two nozzles 37, more preferably the discharge directions of all nozzles 37, of the at least one stop 32; 33; 34 are at least temporarily, preferably permanently, directed at the at least one partial stack arranged in the alignment device 31.

The discharge direction of the ejected fluid, in particular the air, preferably in addition or as an alternative, in relation to the surface normal of the area spanned by the length and height of the at least one stop 32; 33; 34, in a plane parallel to the alignment plane, has an angle of at least 0° (zero degrees) and/or an angle of no more than +80° (plus eighty degrees), preferably of no more than +60° (plus sixty degrees), more preferably of no more than +45° (plus forty-five degrees), and/or an angle of no more than −80° (minus eighty degrees), preferably of no more than −60° (minus sixty degrees), more preferably of no more than −45° (minus forty-five degrees). Preferably in addition or as an alternative, the discharge direction of the ejected fluid, in particular the air, in relation to the surface normal of the area spanned by the length and height of the at least one stop 32; 33; 34, in a plane parallel to the alignment plane, is configured to be settable and/or set and/or is set between an angle of no more than +80° (plus eighty degrees), preferably of no more than +60° (plus sixty degrees), more preferably of no more than +45° (plus forty-five degrees), and an angle of no more than −80° (minus eighty degrees), preferably of no more than −60° (minus sixty degrees), more preferably of no more than −45° (minus forty-five degrees). Preferably, the at least one nozzle 37 has, preferably the at least two nozzles 37 have, a pivot axis that is situated perpendicularly on the alignment plane and/or arranged perpendicularly to the discharge direction. Preferably, the discharge direction of the fluid in or counter to a pivot direction about the pivot axis of the at least one nozzle 37, preferably of the at least two nozzles 37, to the surface normal of the area spanned by the length and height of the at least one stop 32; 33; 34 is configured to be pivotable by an angle of no more than 80° (eighty degrees), preferably of no more than 60° (sixty degrees), more preferably of no more than 45° (forty-five degrees). In this way, the nozzle 37 has, preferably the at least two nozzles 37 have, at least two positions having a respective discharge direction, the discharge directions differing from one another by an angle of no more than 160° (one hundred sixty degrees), preferably of no more than 120° (one hundred twenty degrees), more preferably of no more than 90° (ninety degrees).

Preferably, the velocity of the fluid of the at least one nozzle 37, preferably of the at least two nozzles 37 and/or the discharge direction of the ejected fluid is varied and/or adapted as a function of the number of sheets in the at least one partial stack and/or of the thickness of the sheets and/or of the format size of the sheets. For example, the velocity of the ejected fluid is increased for a partial stack made of thicker sheets, i.e., having a higher grammage, compared to a partial stack made of thinner sheets, i.e., having a lower grammage. For example, the discharge direction of an outer nozzle 37 at the respective stop 32; 33; 34 is pivoted by an angle not equal to 0° (zero degrees), while the discharge direction of a central nozzle 37 at the respective stop 32; 33; 34 is directed parallel to the surface normal of the area spanned by length and height of the at least one stop 32; 33; 34, so that the at least two nozzles 37, preferably all nozzles 37, of the respective stop 32; 33; 34 are preferably directed at a partial stack to be processed. This is necessary, for example, when a sheet format is present in which the outer nozzle 37 in the case of an unpivoted arrangement, i.e., parallel to the surface normal of the area spanned by the length and height of the at least one stop 32; 33; 34, is not directed at the partial stack, for example due to the format size.

At least one of the at least four stops 32; 33; 34 preferably comprises at least one outlet system 38 including at least one outlet opening. At least two of the at least four stops 32; 33; 34 preferably in each case include the at least one outlet system 38. In particular, the at least one front stop 32 and/or the at least one rear stop 34 preferably each include the at least one outlet system 38. More preferably, at least three, more preferably at least four, stops 32; 33; 34 in each case include the at least one outlet system 38.

The at least one outlet opening is preferably arranged parallel to the surface normal of the area spanned by the length and height of the at least one stop 32; 33; 34. More preferably, the at least one outlet opening extends at least partially, preferably completely, through the at least one stop 32; 33; 34, parallel to the surface normal of the area spanned by its length and height.

Preferably, fluid, preferably air, in particular the fluid that is introduced by the at least one blower device, is configured to escape and/or escapes from a region between the at least four stops 32; 33; 34 through the at least one outlet opening. For example, as an alternative or in addition, fluid is actively suctioned out of the region between the at least four stops 32; 33; 34 through the at least one outlet opening, for example by the generation of a vacuum. This preferably prevents the sheets and/or the sheet edges of the at least one partial stack from flapping and/or lifting and/or buckling while the partial stack is being aligned in the alignment device 31.

At least one of the at least four stops 32; 33; 34 preferably includes at least two outlet systems 38, more preferably at least four outlet systems 38, more preferably exactly four outlet systems 38, each having at least one outlet opening. Preferably, the at least two outlet systems 38 are arranged one behind the other along the length of the at least one stop 32; 33; 34. Preferably, the at least one outlet system 38 is, preferably the at least two outlet systems 38 are, each arranged in a top half of the height of the at least one stop 32; 33; 34. Preferably, fluid that is retained as a result, in particular between upper sheets of the at least one partial stack, is configured to escape through the at least one outlet opening.

The at least one outlet system 38 preferably includes the at least one outlet opening, more preferably at least two outlet openings, more preferably at least three outlet openings, more preferably at least six outlet openings. The at least two outlet openings are preferably arranged on top of one another in a vertical direction V, which is preferably situated perpendicularly on the alignment plane, and, for example additionally or alternatively, offset from one another. Preferably, the at least three outlet openings, preferably the at least six outlet openings, are arranged in a V-shaped manner with respect to one another. The tip of the V-shaped arrangement of the at least three outlet openings preferably points in the direction of the alignment plane, preferably downwardly, i.e., counter to the vertical direction V. This arrangement of the at least two outlet openings, preferably of the at least three outlet openings, preferably allows the fluid to optimally escape through the respective outlet openings.

Figure 20:
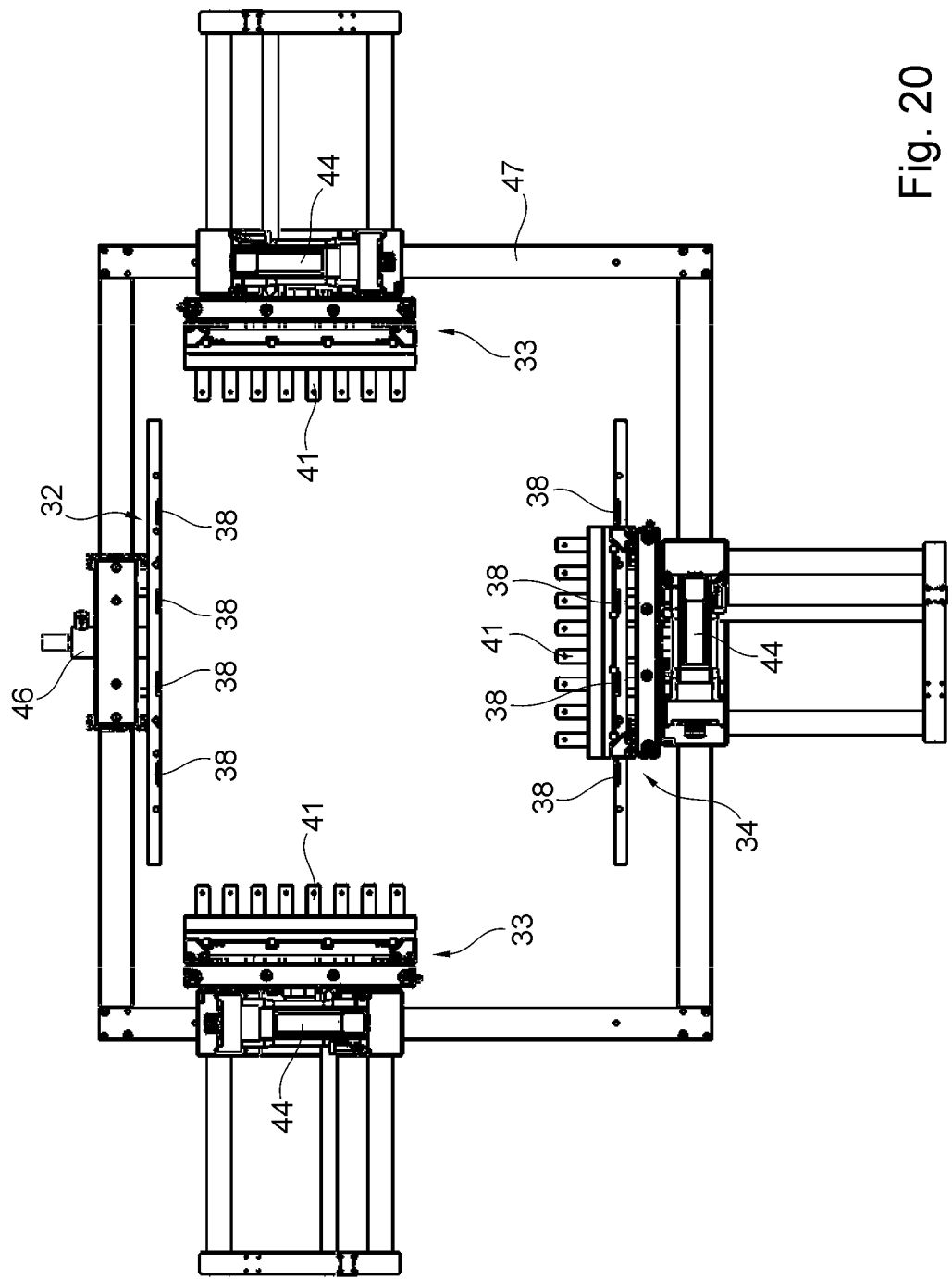
FIG. 20 an alternative alignment device comprising at least four stops in a top view, with two lateral stops and a rear stop each comprising at least one support element.
Figure 21:
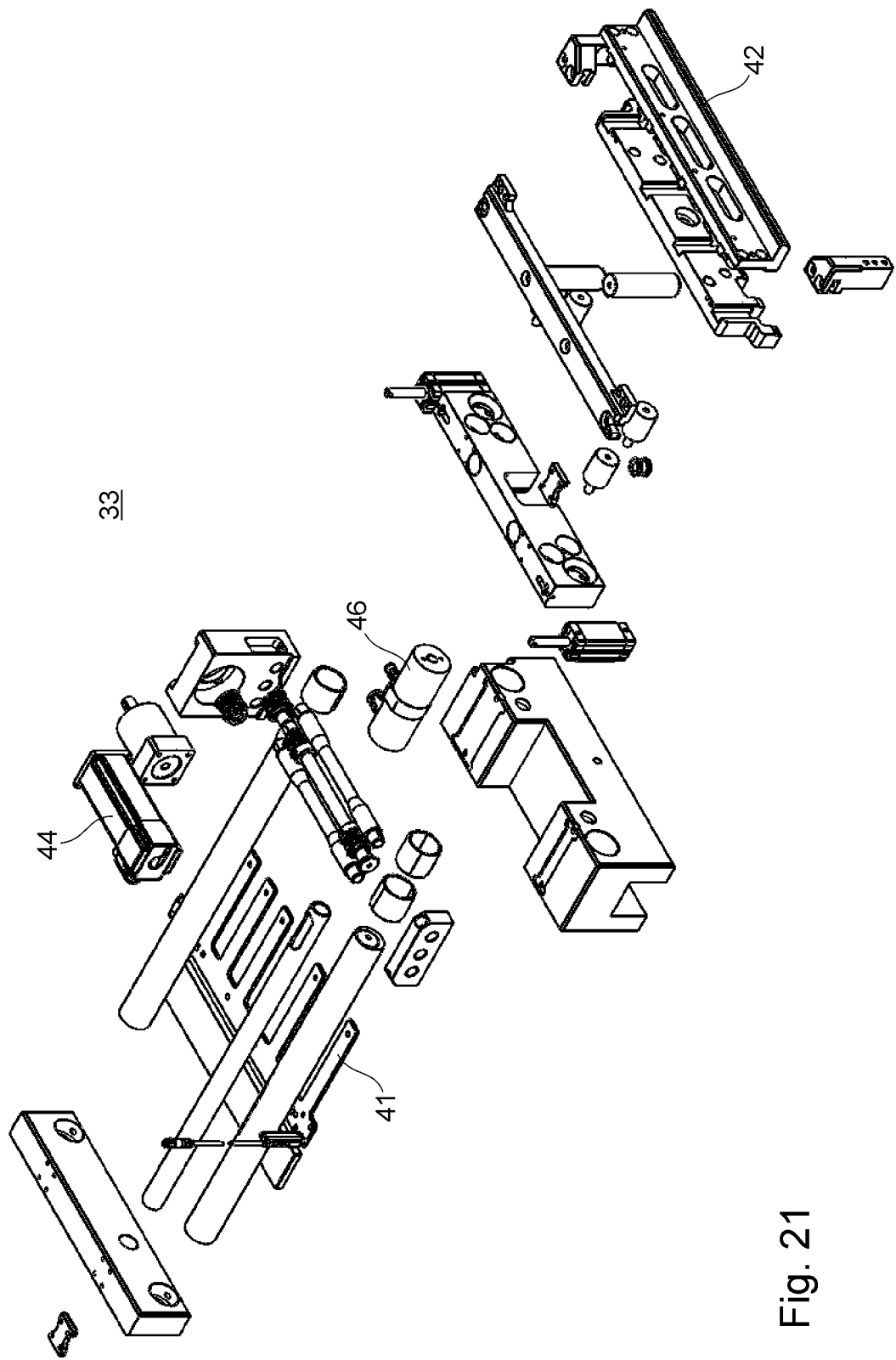
FIG. 21 an exemplary lateral stop illustrated as an exploded-view drawing.

The alignment device 31 comprises at least one support element 41. At least one respective support element 41 is arranged at the at least two lateral stops 33 and at the at least one rear stop 34. At least one respective support element 41 is arranged at least at the two lateral stops 33. Additionally, at least one respective support element 41 is arranged at least at the one rear stop 34. At least the at least two lateral stops 33 in each case comprise at least one support element 41. The at least one rear stop 34 in each case comprises at least one support element 41. The at least one front stop 32 preferably does not comprise a support element 41. A preferred alignment device 31 is shown by way of example in FIG. 16, FIG. 17, FIG. 18 and FIG. 19, wherein the two lateral stops 33 in each case comprise at least one support element 41. FIG. 20 shows an alternative, preferred alignment device 31 by way of example, wherein the two lateral stops 33 as well as the rear stop 34 each comprise at least one support element 41.

The features and feature combinations described above and below are preferably to be applied to all embodiments of the alignment device 31, provided this does not result in any contradiction.

The at least one support element 41 is preferably in each case configured in a fork shape. Preferably, the at least one support element 41 comprises at least two arms, more preferably at least four arms, more preferably a multiplicity of arms, which are each arranged to be directed in the direction of the stop 32; 33 located opposite the stop 33; 34 comprising the support element 41. As an alternative, for example, the at least one support element 41 is configured in a plate shape, for example as a perforated plate. Preferably, free regions, for example the regions between the arms of the at least one support element 41 and/or the regions of the holes in the perforated plate, are configured to discharge fluid and/or air from a region between the at least four stops 32; 33; 34, preferably counter to the vertical direction V.

The at least one support element 41 is preferably arranged in the alignment plane. Preferably in addition or as an alternative, the at least one support element 41 is arranged in a plane, the plane being arranged parallel to the alignment plane. In addition, or as an alternative, the at least one support element 41 is arranged and/or is being arranged so as to be directed in the direction of the stop 32; 33 located opposite the stop 33; 34 that comprises the support element 41. In addition, or as an alternative, the at least one support element 41, preferably with a longest edge, is arranged to be directed in the direction of the stop 32; 33 located opposite the stop 33; 34 that comprises the support element 41. Preferably in addition or as an alternative, the at least one support element 41 is arranged to protrude from the lateral stop 33 comprising the respective support element 41 and/or from the rear stop 34 comprising the respective support element 41, in the direction of the stop 32; 33 located opposite the stop 33; 34 comprising the support element 41, from the lateral stop 33 comprising the respective support element 41 and/or from the rear stop 34 comprising the respective support element 41. Preferably in addition or as an alternative, the at least one support element 41 is arranged to protrude and/or protrudes from the lateral stop 33 comprising the respective support element 41, in the direction of the stop 33, preferably lateral stop 33, located opposite the stop 33 comprising the support element 41, from the lateral stop 33 comprising the respective support element 41. Preferably in addition or as an alternative, the at least one support element 41 is arranged to protrude and/or protrudes from the rear stop 34 comprising the respective support element 41, in the direction of the stop 32, preferably front stop 32, located opposite the stop 34 comprising the support element 41, from the rear stop 34 comprising the respective support element 41. At least one lateral stop 33 of the at least two lateral stops 33, preferably the at least two lateral stops 33, and/or the at least one rear stop 34 preferably in each case have the length and the height. The length and height preferably span a plane. The at least one support element 41 is preferably arranged in a support area. The support area is preferably situated perpendicularly to the plane of the lateral stop 33 and/or of the rear stop 34, the plane preferably being spanned by the length and height. A length and a width of the at least one support element 41 preferably span the support area. The at least one support element 41 is preferably arranged in the support area. The at least one support element 41 preferably has an extension along an edge. An edge of the at least one support element 41 having the shortest extension is preferably its height. An edge of the at least one support element 41 having the longest extension is preferably its length. An edge of the at least one support element 41 having a medium extension is preferably its width.

The at least one support element 41 in each case preferably has at least two positions. The at least one support element 41 can preferably be moved, in particular be moved between the at least two positions. The at least one support element 41, in a first, in particular extended, position, preferably has a first distance, and in a second, in particular retracted, position, has a second distance between its tip, in particular the tip of the at least one arm of the support element 41, and the lateral stop 33 comprising the respective at least one support element 41 or the rear stop 34 comprising the respective at least one support element 41. The tip of the respective support element 41 preferably has the largest distance with respect to the lateral stop 33 comprising the at least one support element 41 or with respect to the rear stop 34 comprising the respective at least one support element 41. The tip of the at least one support element 41 preferably corresponds to the point of the at least one support element 41 which, in the first extended position of the support element 41, with respect to which the stop 33; 34 comprising the at least one support element 41 has the largest distance. The first distance in the first, in particular extended, position is preferably greater than the second distance in the second, in particular retracted, position. In the first position, the at least one support element 41 is preferably configured to protrude further into the region between the at least four stops 32; 33; 34 than in its second position.

Preferably in addition or as an alternative, the at least one support element 41 can preferably be transferred and/or moved and/or is moved from the first position into the second position and/or vice versa. During a transfer from the first position into the second position, the at least one support element 41 is preferably withdrawn from the region between the at least four stops 32; 33; 34, preferably into a spatial area beneath the stop 33; 34 that comprises the respective support element 41 or into a spatial area outside the region between the at least four stops 32; 33; 34. In the second, preferably retracted, position, the tip of the at least one support element 41 is preferably arranged outside the region between the at least four stops 32; 33; 34, for example beneath the at least one stop 33; 34 that comprises the support element 41. Furthermore, during a transfer from the second position into the first position, the at least one support element 41 is moved into the region between the at least four stops 32; 33; 34, preferably proceeding from a spatial area beneath the stop 33; 34 that comprises the respective support element 41 or proceeding from a spatial area outside the region between the at least four stops 32; 33; 34. In the first, preferably extended, position, the tip of the at least one support element 41 is preferably situated within the region between the at least four stops 32; 33; 34. Preferably in addition or as an alternative, the at least two lateral stops 33 and/or the at least one rear stop 34 each comprise at least one drive generating the movement of the at least one support element 41. The at least one support element 41 of the at least one lateral stop 33 of the at least two lateral stops 33 is preferably moved by at least one drive of the at least one lateral stop 33 from the first position into the second position, or vice versa. Preferably in addition or as an alternative, the at least one support element 41 of the at least one rear stop 34 is moved by at least one drive of the at least one rear stop 34 from the first position into the second position, or vice versa.

The at least one partial stack, while being deposited in the at least one alignment device 31, is deposited onto the at least one support element 41, preferably onto at least two support elements 41, more preferably onto at least three support elements 41. The at least one support element 41 is configured as a propping element for propping the at least one partial stack of sheets in the alignment device 31. In particular, the at least one support element 41 is, preferably the at least two support elements 41, more preferably the at least three support elements 41 are configured to prevent the at least one partial stack from falling through the region between the at least four stops 32; 33; 34. By transferring the at least one support element 41 from the first position into the second position, the at least one partial stack can be deposited and/or can be transported and/or is configured to be deposited and/or is configured to be transported onto the pallet 16 and/or fork system and/or plate and/or object at least temporarily generating a bottom, arranged beneath the at least one support element 41, preferably beneath the alignment plane, more preferably beneath the alignment device 31.

Preferably, at least one hold-down device 42 is arranged in each case at the at least two lateral stops 33 and/or the at least one rear stop 34. In the preferred embodiment, for example illustrated in FIG. 16 to FIG. 19, at least in each case the lateral stops 33 comprise at least one hold-down device 42. In the, for example alternative, embodiment in FIG. 20, the lateral stops 33 and the rear stop 34 each comprise at least one hold-down device 42.

The at least one hold-down device 42 is preferably arranged above, preferably in the vertical direction V above, the at least one support element 41 and/or above the alignment plane. Preferably, the distance between the at least one hold-down device 42 and the at least one support element 41 can be set and/or is set. The distance between the at least one hold-down device 42 and the at least one support element 41 is preferably set such that the at least one hold-down device 42 at least temporarily makes contact with the uppermost sheet of the partial stack, in particular from above, but does not press onto a sheet situated therebeneath.

Preferably in addition or as an alternative, the at least one hold-down device 42 at least temporarily has an oscillating movement in or counter to the direction of the at least one support element 41 and/or in or counter to the vertical direction V and/or in or counter to a direction orthogonal to the surface normal of the area spanned by a length and height of the at least one stop 33; 34 comprising the hold-down device 42, in particular parallel to the height of the stop 33; 34. Preferably, the at least one hold-down device 42 is at least temporarily moved in an oscillating manner in or counter to the direction of the at least one support element 41 and/or in or counter to the vertical direction V and/or in or counter to a direction orthogonal to the surface normal of the area spanned by the length and height of the at least one stop 33; 34 comprising the hold-down device 42, in particular parallel to the height of the stop 33; 34. Preferably, at least one drive generating the oscillating movement of the at least one hold-down device 42 is functionally connected to the at least one hold-down device 42. The at least two lateral stops 33 and/or the at least one rear stop 34 preferably each comprise a drive generating the oscillating movement of the at least one hold-down device 42. The oscillating movement of the at least one hold-down device 42 is preferably generated by at least one respective drive of the at least two lateral stops 33 and/or of the at least one rear stop 34.

The at least one hold-down device 42 is preferably configured in a beam shape. The at least one hold-down device 42 preferably generates at least one surface area that rests, preferably at least temporarily, preferably from above, i.e., counter to the vertical direction V, on the at least one partial stack in the alignment device 31 and/or delimits a movement of the at least one partial stack in the vertical direction V and/or toward the top. The at least one hold-down device 42 preferably delimits a movement of the at least one partial stack in the vertical direction V and/or toward the top. The at least one hold-down device 42 is preferably configured to minimize and/or prevent flapping of at least one edge of a sheet of the at least one partial stack and/or lifting of at least one edge of a sheet of the at least one partial stack off at least one sheet therebeneath. Flapping preferably describes a movement of the at least one edge of the sheet, in particular in or counter to a direction that is directed parallel to the surface normal of the alignment plane, i.e., preferably upward or downward. Preferably in addition or as an alternative, the at least one hold-down device 42 is configured to minimize and/or prevent buckling of the edge of the at least one sheet of the at least one partial stack. The at least temporary oscillating movement of the at least one hold-down device 42 is preferably configured to enhance this minimization and/or prevention.

The alignment device 31 preferably comprises at least one blocking device, preferably exactly one blocking device. The at least one blocking device is preferably additionally configured as a turning device for turning sheets and/or the at least one partial stack. The at least one blocking device is preferably configured in a rod shape. The at least one blocking device preferably comprises at least two rods or bars, which are arranged parallel to and spaced apart from one another. The at least one blocking device is preferably arranged at the at least one frame 47 of the alignment device 31, outside the region between the at least four stops 32; 33; 34. The at least one blocking device is preferably arranged on the side of the frame 47 on which the at least one front stop 32 is arranged, at which at least one frame 47 of the alignment device 31, outside the region between the at least four stops 32; 33; 34, is arranged.

Preferably in addition or as an alternative, the at least one blocking device is configured to be pivotable and/or pivoted. The at least one blocking device, preferably as a result of being pivoted, is preferably at least temporarily arranged above the alignment plane. Preferably, the at least one blocking device is preferably configured to pivot, preferably from above, into the region between the at least four stops 32; 33; 34. This preferably ensures that the sheets of the at least one partial stack are permanently held down in the alignment device 31 during the alignment. Preferably in addition or as an alternative, the at least one blocking device is functionally connected to at least one drive generating the pivoting movement. Above and below, a functional connection preferably describes that a first element is at least indirectly or directly connected to a second element and/or is configured to operate together with the second element.

Preferably in addition or as an alternative, the at least one blocking device is configured to turn the at least one partial stack. The at least one partial stack is preferably turned by the at least one blocking device. The sheets are preferably guided with an edge between the at least two bars or rods, and preferably subsequently at least one of the rods or bars is rotated for the purpose of turning. The at least one partial stack is preferably turned prior to being positioned in the alignment device 31. This movement turning the partial stack advantageously avoids bent sheet edges and dog ears.

Preferably, each of the at least four stops 32; 33; 34 comprises at least one drive 44; 46. Preferably, the at least one front stop 32 in particular comprises a drive 46. The at least one front stop 32 preferably does not comprise a drive 44 generating a movement that differs from the vibration or oscillating movement, and preferably it does not comprise a linear drive 44. Preferably in addition or as an alternative, the at least two lateral stops 33 and/or the at least one rear stop 34 each comprise at least two drives 44; 46.

FIG. 16 to FIG. 21 show the alignment device 31 or components of the alignment device 31. Preferably all four stops 32; 33; 34 in each case comprise a drive 46 configured as a vibratory drive 46, and the two lateral stops 33 and the rear stop 34 in each case comprise a drive 44 configured as a linear drive 44. For drawing-related reasons, the drives 44; 46 are not each denoted by reference numerals in the figures for each stop 32; 33; 34 since they are hidden by other components, for example.

Preferably, at least one of the at least four stops 32; 33; 34 comprises at least one drive 46 generating a vibration and/or an oscillating movement. Preferably, at least two stops 32; 33; 34, more preferably at least three stops 32; 33; 34, more preferably the at least four stops 32; 33; 34 each comprise the drive 46 generating a vibration or an oscillating movement. The at least two lateral stops 33 and/or the at least one rear stop 34 and/or the at least one front stop 32 preferably each comprise the drive 46 generating a vibration and/or an oscillating movement. Preferably, each of the at least two lateral stops 33 and the at least one rear stop 34 each comprise a dedicated drive 46 generating the vibration or oscillating movement. The at least one front stop 32 preferably in each case comprises a dedicated drive 46 generating the vibration or oscillating movement. Preferably, the at least two lateral stops 33 and/or the at least one rear stop 34 each comprise at least one support element 41. The at least one drive 46 generating a vibration or an oscillating movement is thus preferably configured to cause the at least one support element 41 to carry out a vibration or an oscillating movement, preferably together with the stop 33; 34 comprising the at least one support element 41. The at least one drive 46 generating a vibration and/or an oscillating movement is preferably configured as a vibratory drive 46. The drive 46 generating the vibration or oscillating movement is preferably pneumatically operated and/or configured as a pneumatic drive 46 and/or configured as at least one piston vibrator. The frequency of the vibration or oscillating movement is preferably set and/or settable and/or is being set as a function of the format size of the sheets and/or of the grammage of the sheets and/or of the material of the substrate.

For example, the at least one vibratory drive 46 is additionally configured to generate the oscillating movement of the at least one hold-down device 42. As an alternative, for example, the at least one hold-down device 42 comprises a drive that differs from the at least one vibratory drive 46.

Preferably in addition or as an alternative, the at least two lateral stops 33 and/or the at least one rear stop 34 each comprise at least one drive 44 generating at least one movement, preferably a movement that differs from the vibration or oscillating movement. More preferably in addition or as an alternative, the at least two lateral stops 33 and/or the at least one rear stop 34 each comprise at least one drive 44 generating at least one linear movement. Preferably, the at least two lateral stops 33 and the at least one rear stop 34 each comprise at least one dedicated drive 44 generating the at least one movement that differs from the vibration or oscillating movement, preferably at least one dedicated drive 44 generating the linear movement. Preferably, the at least one drive 44 preferably generating the movement that differs from the vibration or oscillating movement, more preferably the linear movement, is configured as a linear drive 44. The drive 44 preferably generating the movement that differs from the vibration or oscillating movement, more preferably generating the linear movement, is preferably configured as a servo motor and/or as an electric motor, for example a closed loop position-controlled electric motor. The at least one drive 44 generating at least one movement that differs from the vibration or oscillating movement, preferably the drive 44 generating the at least one linear movement, is preferably configured independently from the drive 46 generating at least a vibration or an oscillating movement. Preferably, the at least one drive 44 generating at least one movement that differs from the vibration or oscillating movement, preferably the drive 44 generating at least one linear movement, moves the at least one stop 33; 34, preferably at least one of the at least two lateral stops 33 and/or the at least one rear stop 34, independently of the drive 46 generating at least one vibration or oscillating movement.

For example, the drive 44 preferably generating the movement that differs from the vibration or oscillating movement, more preferably generating the linear movement, more preferably the at least one linear drive 44, is configured to additionally generate the movement of the at least one support element 41 from the first position into its second position, or vice versa. As an alternative, the at least one support element 41, for example, comprises a drive that differs from the at least one linear drive 44.

The at least two lateral stops 33 and/or the at least one rear stop 34, however, preferably each have at least one first position and at least one second position. Preferably, the respective distance of the at least two lateral stops 33 and/or the at least one rear stop 34 with respect to the at least one front stop 32 in the first position differs from the distance in the second position. The at least one of the at least two lateral stops 33, preferably the at least two lateral stops 33, and/or the at least one rear stop 34 in the first position preferably have a larger distance with respect to the respective opposing stop 32; 33 than in the second position. Preferably, the transition of the at least one lateral stop 33 of the at least two lateral stops 33 from the respective first position into the respective second position corresponds to a movement of the at least one lateral stop 33 toward an opposing stop 33. Preferably, the transition of the at least one rear stop 34 from the respective first position into the respective second position corresponds to a movement of the at least one rear stop 34 toward an opposing stop 32. A region between the at least four stops 32; 33; 34 preferably has a first surface area within a plane orthogonal to the vertical direction V, when at least one of the at least two lateral stops 33, preferably the at least two lateral stops 33, and/or the at least one rear stop 34 are arranged in the first position. The region between the at least four stops 32; 33; 34 preferably has a second surface area within the plane orthogonal to the vertical direction V, when at least one of the at least two lateral stops 33, preferably the at least two lateral stops 33, and/or the at least one rear stop 34 are arranged in the second position. The second surface area is preferably smaller than the first surface area. Preferably, the drive 44 generating the movement that differs from the vibration or oscillating movement, more preferably generating the linear movement, is configured to generate the movement of the at least two lateral stops 33 and/or of the at least one rear stop 34 from the first position into the second position, or vice versa. Preferably, the movement of the at least two lateral stops 33 and/or of the at least one rear stop 34, in each case from the first position into the second position, or vice versa, takes place during the alignment of the at least one partial stack, preferably in addition to a vibration or an oscillating movement of the stops 32; 33; 34. Preferably, the at least two lateral stops 33 and/or the at least one rear stop 34 are each moved from the at least one first position into the at least one second position, or vice versa. Preferably, the at least one of the at least two lateral stops 33, preferably the at least two lateral stops 33, and/or the at least one rear stop 34 are each moved from the first position into the second position, or vice versa, by the at least one drive 44 preferably generating the movement that differs from the vibration or oscillating movement, more preferably generating the linear movement. Preferably in addition or as an alternative, the at least one of the at least two lateral stops 33, preferably the at least two lateral stops 33, and/or the at least one rear stop 34 are adjusted from the first position into a further second position, to carry out a format adjustment corresponding to the format of the sheets of the partial stack to be aligned. For example, in addition to the format adjustment, the at least one of the at least two lateral stops 33, preferably the at least two lateral stops 33, and/or the at least one rear stop 34 are moved from the first position into the second position, or vice versa, during the alignment.

The at least two lateral stops 33 and/or the at least one rear stop 34 preferably have at least one linear guide. The at least one linear guide is preferably equipped with rolling elements and/or plain bearings. The at least one linear guide is preferably configured as a mechanical guide element, with the aid of which at least one component of the respective stop 33; 34, preferably the entire lateral stop 33 or rear stop 34, can be moved and/or is moved against at least one other component, preferably the at least one frame 47, on a straight line, which is preferably directed parallel to the alignment plane and/or parallel to the surface normal of the plane spanned by the length and height of the respective stop 33; 34.

Preferably, the at least one drive of the at least one blocking device is configured to generate a movement independently of the at least one linear drive 44, preferably of the drive 44 generating the movement that differs from the vibration or oscillating movement, and/or of the at least one vibratory drive 46. Preferably, the at least one linear drive 44, preferably all linear drives 44, of the alignment device 31, more preferably the drive 44 generating the movement that differs from the vibration or oscillating movement and/or the at least one vibratory drive 46, preferably all vibratory drives 46, of the alignment device 31, and/or the at least one drive of the at least one blocking device and/or at least one further drive, for example of the at least one support element 41 and/or of the at least one hold-down device 42, are connected to one another via at least one preferably electronic master axis.

The alignment device 31 is preferably configured as an upper module within the substrate handling system. For example, the alignment device 31 is functionally connected to at least one lower module, which is preferably arranged beneath the alignment device 31. The at least one lower module is preferably configured as an infeed tower, the infeed tower positioning a number of partial stacks on top of one another, and/or as at least one plate, whereby the alignment device 31 and the at least one plate, in particular in combination, replace a conventional jogging table, and/or as a transport plate and/or as a feeder 02, for example as the non-stop feeder 02, and/or as a pallet 16.

The at least one partial stack is advantageously aligned and/or loosened by the at least one alignment device 31. The at least one partial stack is positioned in the alignment device 31 for this purpose. For example, the at least one partial stack is positioned, in particular deposited, in the alignment device 31 by the at least one robot 12 or by an operator. The at least one partial stack, while being positioned in the alignment device 31, is deposited onto the at least one support element 41, preferably onto at least two support elements 41, of at least two stops 33; 34. The at least one partial stack, while being positioned in the alignment device 31, is deposited onto the at least one support element 41 that is in each case arranged at the at least two lateral stops 33. In addition, the at least one partial stack, while being positioned in the alignment device 31, is deposited onto the at least one support element 41 that is arranged at the at least one rear stop 34. The at least one partial stack, while being positioned in the alignment device 31, is deposited onto the at least one support element 41 that is in each case arranged at the at least two lateral stops 33, and onto the at least one support element 41 that is arranged at the at least one rear stop 34.

The at least one front stop 32 is preferably fixed in its position, preferably at least temporarily. Of the at least four stops 32; 33; 34, the at least two stops 33 configured as lateral stops 33 and the at least one stop 34 configured as the rear stop 34 are moved at least temporarily and/or are configured to be movable.

Lateral edges of the partial stack and/or lateral edges of the sheets are preferably delimited by the at least four stops 32; 33; 34. In particular, the at least four stops 32; 33; 34 are at least temporarily in direct contact, i.e., without further elements therebetween, with the at least one partial stack and/or the sheets of the partial stack.

The at least one partial stack is preferably loosened after a first alignment, and is then aligned again in the alignment device 31. Preferably, the at least one partial stack, for example as part of the at least one substrate stack 14, is aligned in the infeed system 06, for example as a first alignment within the substrate handling system. Preferably, the at least one partial stack is then removed from the at least one substrate stack 14 and is loosened. The loosening is, in particular, carried out by an operator or, alternatively, by the at least one robot 12 of the robot cell 11. Preferably subsequent to the loosening, it is necessary to align the at least one partial stack again, so that in particular the edges of the sheets of the partial stack are preferably arranged exactly on top of one another, wherein, however, the loosened arrangement of the sheets with respect to one another is preserved. The subsequent alignment and further loosening take place in the at least one alignment device 31.

Preferably, at least one of the at least two lateral stops 33 and/or the at least one rear stop 34 are each moved by at least two drives 44; 46.

In particular during the alignment of the at least one partial stack, preferably at least one of the at least two lateral stops 33, preferably the at least two lateral stops 33, and/or the at least one rear stop 34 are moved in the direction of the at least one partial stack. Preferably, the at least one of the at least two lateral stops 33 and/or the at least one rear stop 34 are each moved by the at least one drive 44 generating at least one movement, preferably the movement that differs from the vibration or oscillating movement, more preferably the linear movement. Preferably, the at least two lateral stops 33 and/or the at least one rear stop 34 are each moved from the first position into the second position, or vice versa, by at least one dedicated drive 44 generating the movement, preferably the movement that differs from the vibration or oscillating movement, more preferably the linear movement.

Preferably in addition or as an alternative, at least one of the at least four stops 32; 33; 34, preferably at least two, more preferably at least three, more preferably the at least four stops 32; 33; 34, more preferably all stops 32; 33; 34 generate at least one vibration and/or vibrate, during the alignment of the at least one partial stack. Preferably, the at least two lateral stops 33 and/or the at least one rear stop 34 and/or the at least one front stop 32 are each caused to carry out a vibration and/or an oscillating movement by the at least one drive 46 generating a vibration and/or an oscillating movement, preferably in each case by a dedicated drive 46. The at least one support element 41 preferably vibrates during the alignment of the at least one partial stack, preferably as a result of the vibration of the at least one stop 33; 34 comprising the support element 41 and/or preferably together with the at least one stop 33; 34 comprising the support element 41. Preferably, the at least one drive 46 generating the vibration or oscillating movement causes the at least one support element 41 to carry out a vibration or an oscillating movement.

More preferably, at least the at least one of the at least two lateral stops 33 and/or the at least one rear stop 34 are each caused to carry out a vibration and/or an oscillating movement by the drive 46 generating a vibration and/or an oscillating movement, and are simultaneously moved linearly by the at least one drive 44 generating at least one linear movement. Preferably, at least two of the at least four stops 32; 33; 34, preferably all stops 32; 33; 34, are caused to carry out a vibration and/or an oscillating movement, while preferably only at least one of the at least two lateral stops 33 and/or the at least one rear stop 34 are caused to carry out a movement in or counter to the direction of the opposing stop 32; 33 and/or of the at least one partial stack.

Preferably, the at least one nozzle 37, preferably the at least two nozzles 37, of the blower device ejects or eject fluid, in particular air, at least while the partial stack is being aligned. Preferably, the fluid, in particular the air, leaves the at least one nozzle 37, preferably the at least two nozzles 37, in the discharge direction. In particular, the ejected fluid supports the loosening of the partial stack in the alignment device 31. The velocity of the ejected fluid can preferably be varied and/or adapted as a function of the number of sheets in the partial stack and/or of the thickness of the sheets and/or of the format size of the sheets. Preferably, the fluid generates an air cushion beneath the bottommost sheet of the at least one partial stack and, in addition or as an alternative, the fluid loosens the individual sheets of the at least one partial stack by penetrating between the individual sheets.

In particular, the ejected fluid as well as, for example, further fluid, in particular air, retained by the at least one partial stack, preferably escapes from the region between the at least four stops 32; 33; 34 through the at least one outlet opening of the at least one outlet system 38. For example, the at least one fluid only escapes due to its movement through the at least one outlet opening. For example, in addition, the at least one fluid is suctioned off through the at least one outlet opening.

Above and below, the expression "at least temporarily" preferably describes a state and/or process that is present and/or is carried out at at least one point in time. "At least temporarily" preferably describes a state and/or process that is present and/or is carried out at least while the at least one stack is being positioned and/or aligned in the alignment device 31. Above and below, the expression "fixed in a position" preferably describes that the at least one stop 32; 33; 34 is not moved from a first position into a second position, but resides in its currently arranged position. For example, it is possible for the at least one stop 32; 33; 34 to vibrate while being fixed in the position.

Preferably, at least the at least one front stop 32 and at least one of the at least two lateral stops 33 are fixed and/or are being fixed in their positions at least temporarily, preferably while the at least one partial stack is being aligned in the alignment device 31. Preferably, the at least one front stop 32 and the at least one of the at least two lateral stops 33 are configured to be at least temporarily fixed in the respective position within the alignment plane. More preferably, the at least one front stop 32 and the at least one of the at least two lateral stops 33 are configured, in particular, so as not to be at least temporarily linearly movable and/or so as not to move linearly within the alignment plane. The at least one front stop 32 and the at least one of the at least two lateral stops 33 are preferably spaced a constant distance apart from the frame 47 of the alignment device 31 for at least this duration. Preferably, the at least one front stop 32 and the at least one of the at least two lateral stops 33 thus create two preferably stationary boundaries, against which the at least one partial stack is preferably aligned.

Preferably, at least temporarily, the at least one rear stop 34 and at least one further of the at least two lateral stops 33 are configured to at least temporarily decrease or increase their respective distance with respect to the, preferably fixed, front stop 32 or with respect to the, preferably fixed, lateral stop 33, preferably at least while the at least one partial stack is being aligned in the alignment device 31. Preferably, the at least one rear stop 34 and the at least one further of the at least two lateral stops 33 are moved at least temporarily, preferably at least while the at least one partial stack is being aligned in the alignment device 31, toward the, preferably fixed, front stop 32 or toward the, preferably at least temporarily fixed, lateral stop 33. The movement in the direction of the, preferably fixed, front stop 32 or of the, preferably at least temporarily fixed, lateral stop 33 is preferably carried out until the distance between the mutually opposing stops 32; 33; 34 corresponds to the extension of a sheet of the at least one partial stack, in particular corresponding to its format size, in the direction of this distance. More preferably, the at least one rear stop 34 and the at least one further of the at least two lateral stops 33 are moved toward the, preferably fixed, front stop 32 and/or toward the, preferably at least temporarily fixed, lateral stop 33 until the distance between the mutually opposing stops 32; 33; 34 falls below the extension of the sheet, i.e., its format size, in the direction of this distance by at least 0 mm (zero millimeters), preferably by at least 3 mm (three millimeters), and/or by no more than 20 mm (twenty millimeters), preferably by no more than 15 mm (fifteen millimeters), more preferably by no more than 10 mm (ten millimeters). The sheet is thus preferably at least temporarily in contact with the at least four stops 32; 33; 34 and/or is preferably at least temporarily compressed, i.e., pushed together to below its actual format size.

The movement of the at least one rear stop 34 and of the at least one further of the at least two lateral stops 33 in the direction of the, preferably fixed, front stop 32 and/or of the, preferably at least temporarily fixed, lateral stop 33 is preferably carried out in a back-step method, i.e., an alternation between a forward movement and a backward movement. Preferably, a forward movement in the direction of the, preferably fixed, front stop 32 and/or of the, preferably at least temporarily fixed, lateral stop 33 is carried out in each case for at least 3 mm (three millimeters), preferably for at least 5 mm (five millimeters), which is preferably followed in each case by a backward movement counter to the direction of the, preferably fixed, front stop 32 and/or of the, preferably at least temporarily fixed, lateral stop 33 of at least one millimeter, preferably of at least 2 mm (two millimeters).

Preferably downstream from the alignment device 31, the at least one partial stack is guided and/or transferred to the at least one printing unit 03 of the sheet processing machine 01 and/or to the at least one feeder 02 of the sheet processing machine 01 and/or to the at least one unit processing the sheets. For example, the at least one partial stack is broken down into individual sheets for this purpose, which are forwarded, for example, in an imbricated or mutually spaced arrangement.

Preferably, at least one pallet 16 and/or at least one fork system and/or at least one plate and/or at least one object at least temporarily generating a bottom are positioned beneath the alignment device 31 and/or beneath the at least one support element 41 and/or beneath the alignment plane. Preferably then, preferably subsequently to the alignment by the alignment device 31, the aligned partial stack is delivered, in particular by the movement of the at least one support element 41 from the first, extended position into the second, retracted position, to the at least one pallet 16 and/or the at least one fork system and/or the at least one plate and/or the at least one object at least temporarily generating a bottom, without further elements or devices therebetween. More preferably, at least two support elements 41, more preferably at least three support elements 41, more preferably all support elements 41 are moved from the first, extended position into the second, retracted position. As a result of the movements of the support elements 41, the aligned partial stack is preferably delivered to the at least one pallet 16 and/or the at least one fork system and/or the at least one plate and/or the at least one object at least temporarily generating a bottom. Preferably, at least two, preferably at least three, more preferably multiple, partial stacks are thus deposited and/or collected on top of one another, in particular beneath the alignment device 31. In this way, for example, the at least one partial stack is fed to a substrate stack 14, which then preferably encompasses at least 1,000 sheets (one thousand sheets), preferably at least 2,000 sheets, and/or no more than 10,000 sheets, preferably no more than 8,000 sheets.

Preferably in addition or as an alternative, the at least one partial stack is removed laterally from the alignment device 31. For this purpose, at least one of the at least four stops 32; 33; 34 is preferably pivoted from a first, upright position into a second, pivoted position. Preferably in the second, pivoted position, its lateral surface, spanned by the height and length, is at least temporarily arranged parallel to the alignment plane. The aligned partial stack is then preferably removed from the alignment device 31 at the at least one stop 32; 33; 34 that is arranged in the second, pivoted position.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A substrate handling system comprising a sheet processing machine (01) and at least one alignment device (31), the at least one alignment device (31) comprising at least four stops (32; 33; 34), at least one stop (32) being configured as a front stop (32) and at least one stop (34) being configured as a rear stop (34), and at least two stops (33) being configured in each case as a lateral stop (33), the at least two lateral stops (33) being arranged opposite one another, the at least one front stop (32) and the at least one rear stop (34) being arranged opposite one another, the alignment device (31) comprising at least one support element (41), the at least one support element (41) being configured as a propping element for propping at least one partial stack of sheets in the alignment device (31), characterized in that a first one of the at least two lateral stops (33) comprises at least one respective support element (41), a second one of the at least two lateral stops (33) comprises at least one respective support element (41), and the at least one rear stop (34) comprises at least one respective support element (41), that the at least one respective support element (41) in each case has at least two positions, that the at least one respective support element (41), in a first position has a first distance, and in a second position has a second distance, between its tip and the first and/or second lateral stop (33) comprising the at least one respective support element (41) or the rear stop (34) comprising the at least one respective support element (41), and that the first distance in the first position is greater than the second distance in the second position.

2. The substrate handling system according to claim 1, characterized in that the at least four stops (32; 33; 34) in each case comprise at least one drive (46) generating a vibration or an oscillating movement and/or that the at least two lateral stops (33) and/or the at least one rear stop (34) each comprise at least one drive generating a movement of the at least one respective support element (41) that a respective stop (33, 34) comprises, and/or that the at least two lateral stops (33) and/or the at least one rear stop (34) each comprise at least one drive (44) generating at least one movement that differs from the vibration or oscillating movement.

3. The substrate handling system according to claim 2, characterized in that the at least one drive (46) generating a vibration or an oscillating movement is configured to cause the at least one respective support element (41) to carry out a vibration or an oscillating movement and/or that each of the at least two lateral stops (33) and the at least one rear stop (34) each comprise at least one dedicated drive (46) generating the vibration or oscillating movement and/or that a frequency of the vibration or oscillating movement of the at least four stops (32; 33; 34) is set and/or settable as a function of a format size of sheets and/or of a grammage of sheets and/or of a material of the substrate.

4. The substrate handling system according to claim 2, characterized in that the at least one drive (44) generating at least one movement that differs from the vibration or oscillating movement is configured in each case to generate the movement of at least one of the at least two lateral stops (33) and/or of the at least one rear stop (34) from the first position into the second position, or vice versa, and/or that the at least one drive (44) generating at least one movement that differs from the vibration or oscillating movement is configured independently from the drive (46) generating at least one vibration or oscillating movement, and/or that the at least two lateral stops (33) and the at least one rear stop (34) each comprise at least one drive (44) generating the at least one movement that differs from the vibration or oscillating movement.

5. The substrate handling system according to claim 1, characterized in that at least the at least one front stop (32) and at least one of the at least two lateral stops (33) are fixed in their positions at least temporarily and, at least temporarily, the at least one rear stop (34) and at least one further of the at least two lateral stops (33) are configured to at least temporarily decrease or increase a respective distance with respect to the fixed front stop (32) or with respect to the fixed lateral stop (33).

6. The substrate handling system according to claim 1, characterized in that the alignment device (31) is arranged upstream from at least one printing unit (03) of the sheet processing machine (01) and/or upstream from at least one feeder (02) of the sheet processing machine (01) and/or upstream from at least one unit processing the sheets and/or in an infeed system (06) of the sheet processing machine (01) and/or within the operating zone of a robot cell (11).

7. The substrate handling system according to claim 1, characterized in that at least one hold-down device (42) is arranged in each case at the at least two lateral stops (33) and/or at the at least one rear stop (34).

8. The substrate handling system according to claim 1, characterized in that at least one of the at least four stops (32; 33; 34) includes at least one blower device and the at least one blower device comprises at least one nozzle (37) that ejects fluid, and/or that at least one of the at least four stops (32; 33; 34) comprises at least one outlet system (38) including at least one outlet opening, and fluid is configured to escape from a region between the at least four stops (32; 33; 34) through the at least one outlet opening.

* * * * *